(12) United States Patent
Asakura et al.

(10) Patent No.: US 8,208,197 B2
(45) Date of Patent: Jun. 26, 2012

(54) OPTICAL FILM, AND POLARIZING PLATE AND LIQUID CRYSTAL DISPLAY DEVICE USING THE OPTICAL FILM

(75) Inventors: Tetsuya Asakura, Minami-Ashigara (JP); Hiroyuki Yoneyama, Minami-Ashigara (JP); Naohiro Matsunaga, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 367 days.

(21) Appl. No.: 12/032,389

(22) Filed: Feb. 15, 2008

(65) Prior Publication Data
US 2008/0198446 A1    Aug. 21, 2008

(30) Foreign Application Priority Data

Feb. 19, 2007    (JP) ................ P2007-038544

(51) Int. Cl.
*G02B 5/20*    (2006.01)
*F21V 9/06*    (2006.01)
(52) U.S. Cl. ..................... 359/361; 252/589
(58) Field of Classification Search ............... 359/361; 252/588, 589
See application file for complete search history.

(56) References Cited

U.S. PATENT DOCUMENTS

| 2005/0134959 A1* | 6/2005 | Simpson et al. ......... 359/359 |
| 2005/0170180 A1 | 8/2005 | Kawa |
| 2005/0260392 A1* | 11/2005 | Sugino et al. ......... 428/212 |
| 2006/0188664 A1 | 8/2006 | Ando et al. |
| 2006/0234035 A1 | 10/2006 | Wang et al. |
| 2007/0048459 A1* | 3/2007 | Takebe et al. ......... 428/1.31 |
| 2007/0065602 A1* | 3/2007 | Fukuda et al. ......... 428/1.1 |

FOREIGN PATENT DOCUMENTS

| JP | 4-242055 A | 8/1992 |
| JP | 2001-215320 A | 8/2001 |
| JP | 2002-249600 A | 9/2002 |
| JP | 2004-148542 A | 5/2004 |
| JP | 2004-149782 A | 5/2004 |
| JP | 2006-247954 A | 9/2006 |
| JP | 2006-257402 A | 9/2006 |
| WO | 2006/019086 A1 | 2/2006 |
| WO | 2006/113164 A1 | 10/2006 |

OTHER PUBLICATIONS

Japanese Office Action dated Apr. 3, 2012 for Application No. 2008-034863 with English translation.

* cited by examiner

*Primary Examiner* — Frank Font
(74) *Attorney, Agent, or Firm* — Birch, Stewart, Kolasch & Birch, LLP

(57) ABSTRACT

An optical film includes a filmy support that includes a polymer having all alicyclic structure; an ultraviolet absorbing layer; and a hardcoat layer, wherein the ultraviolet absorbing layer has a beam transmittance of 5% or less in a wavelength region of 200 to 340 nm and includes at least one ultraviolet absorbent selected from the group consisting of a metal oxide fine particle and a polymer particle.

18 Claims, 1 Drawing Sheet

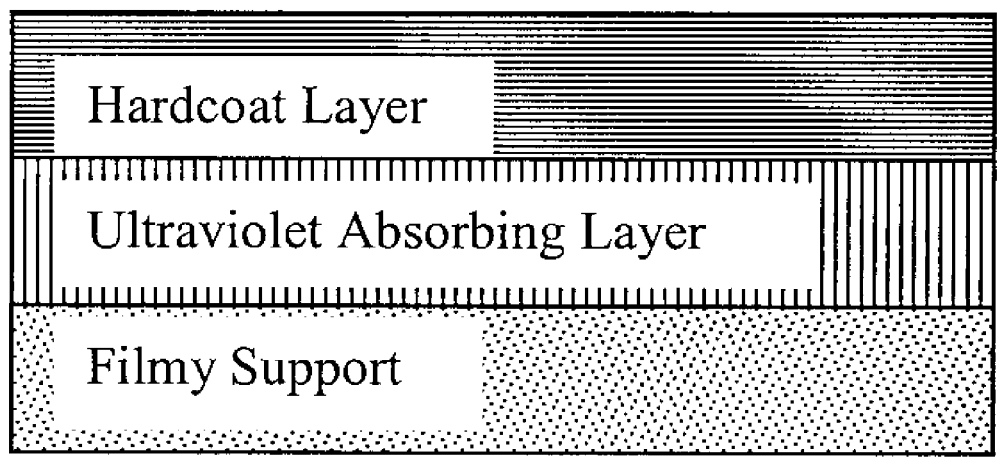

OPTICAL FILM, AND POLARIZING PLATE AND LIQUID CRYSTAL DISPLAY DEVICE USING THE OPTICAL FILM

BACKGROUND OF THE INVENTION

1. Field of the Invention

The present invention relates to an optical film, and a polarizing plate and a liquid crystal display device each using the optical film.

2. Description of the Related Art

With the remarkable progress in the information industry, a display device is utilized in various places. In particular, a liquid display device is making striking progress and is mounted in various instruments. In these liquid crystal display devices, stability of display quality in the installed environment is an important matter.

The polarizing plate used in the liquid crystal display device is usually produced by sandwiching a polarizer between two protective films, and triacetyl cellulose (TAC) is preferably used as the polarizing plate protective film. However, humidity condition for a long time, sometimes causes a problem that light leakage or the like is generated and the display quality cannot be maintained.

On the other hand, a polymer having an alicyclic structure is excellent in the transparency, heat resistance and chemical resistance and less absorbs moisture and therefore, its use as a polarizing plate protective film is known. The above-described durability is enhanced as compared with the case using TAC, but this method has a problem that since the polymer having an alicyclic structure does not absorb an ultraviolet ray at a wavelength longer than 300 nm, the polarizing plate protective film itself deteriorates due to an ultraviolet ray or its underlayer such as polarizer, color filter and liquid crystal molecule deteriorates.

In order to prevent deterioration by an ultraviolet ray, studies are being made to cut the ultraviolet ray. As regards the method therefor, a technique of incorporating an ultraviolet absorbent into a polymer film having an alicyclic structure is disclosed (see, JP-A-2002-249600 (the term "JP-A" as used herein means an "unexamined published Japanese patent application"))

SUMMARY OF THE INVENTION

However, the polymer film having an alicyclic structure and containing an ultraviolet absorbent exhibits poor adhesion to a hardcoat layer which is often stacked and used for enhancing the strength of the polarizing plate protective film, and the hardcoat layer is disadvantageously separated from the film.

The present invention has been made to solve those various problems in conventional techniques and achieve the following aspects. That is, an aspect of the present invention is to provide an optical film reduced in the deterioration by an ultraviolet ray, assured of high antireflection ability, good prevention of dimensional change due to humidity, strong film property and no separation of layers during production or handling (e.g., coating, transportation), and excellent in the transparency and scratch resistance. Another aspect of the present invention is to provide an antireflection film excellent in the antireflection property and other optical performances as well as in the prevention of ultraviolet ray. A still another aspect of the present invention is to provide a high-quality polarizing plate and a high-grade liquid crystal display device each equipped with the above-described antireflection film.

As a result of intensive studies, the present inventors have found that when an ultraviolet-blocking layer and a hardcoat layer are sequentially stacked on a support comprising a polymer having an alicyclic structure and at least one member selected from a metal oxide fine particle and a polymer particle is contained as an ultraviolet absorbent, a well-balanced antireflection film satisfying both ultraviolet-blocking property and antireflection property can be obtained.

According to the present invention, an optical film, a polarizing plate and a liquid crystal display device each having the following constructions are provided, and the above-described aspects are attained by these constructions.

<1> An optical film comprising:
a filmy support that comprises a polymer having an alicyclic structure;
an ultraviolet absorbing layer; and
a hardcoat layer,
wherein the ultraviolet absorbing layer has a beam transmittance of 5% or less in a wavelength region of 200 to 340 nm and comprises at least one ultraviolet absorbent selected from the group consisting of a metal oxide fine particle and a polymer particle.

<2> The optical film as described in <1>, wherein the metal oxide fine particle comprises at least one selected from the group consisting of titanium oxide, zinc oxide, cerium oxide and iron oxide, each having an average primary particle diameter of 1 to 100 nm.

<3> The optical film as described in <1>, wherein the metal oxide fine particle comprises a fine particulate titanium oxide having a rutile crystallinity of 20 to 70%.

<4> The optical film as described in <1>, wherein the polymer particle comprises a compound having an absorption capability in an ultraviolet region of 200 to 340 nm, <5> The optical film as described in <1>, wherein an ultraviolet absorbing monomer, which is one of raw materials of the polymer particle, is a vinyl compound, to a main chain of which at least one of a 2-hydroxybenzophenone derivative and a 2-hydroxyphenylbenzotriazole derivative is bonded as a side chain.

<6> The optical film as described in <1>, wherein the ultraviolet absorbing layer comprises an electrically conductive metal oxide.

<7> The optical film as described in <1>, wherein the ultraviolet absorbing layer has a thickness of 50 to 2,000 nm.

<8> The optical film as described in <1>, which has an internal haze of 10 to 90%.

<9> The optical film as described in <1>, comprising:
a low refractive index layer as an outermost layer of the optical film,
wherein the low refractive index layer has a refractive index lower than a refractive index of a layer adjacent to the low refractive index layer.

<10> The optical film as described in <1>, which has a transmittance of 0 to 50% to light at a wavelength of 380 nm and a transmittance of 80 to 100% to light at a wavelength of 600 nm.

<11> The optical film as described in <1>, wherein the filmy support has a moisture permeability of 300 $g/m^2 \cdot day$ or less at 60° C. and 95% relative humidity.

<12> The optical film as described in <1>, wherein the filmy support has a thickness of 5 to 200 μm.

<13> The optical film as described in <1>, wherein the filmy support has a glass transition temperature of 80° C. or more.

<14> The optical film as described in <1>, wherein
at least one surface of the filmy support is corona discharge-treated or glow discharge-treated.

<15> A polarizing plate comprising:
a polarizer; and
the optical film as described in <1>.

<16> The polarizing plate as described in <15>, wherein
the polarizer is sandwiched between two protective films, one of which is the optical film and the other of which is a film that mainly comprises a cellulose ester film.

<17> The polarizing plate as described in <16>, wherein
the film mainly comprising a cellulose ester film has a viewing angle compensating function.

<18> The polarizing plate as described in <16>, wherein
the film mainly comprising a cellulose ester film has an optically anisotropic layer provided by coating.

<19> A liquid crystal display device comprising:
a liquid crystal cell; and
a pair of polarizing plates, between which the liquid crystal display is sandwiched,
wherein
at least one of the pair of polarizing plates is the polarizing plate as described in <15>.

<20> The liquid crystal display device as described in <19>, further comprising:
a brightness-enhancing film.

BRIEF DESCRIPTION OF THE DRAWING

FIG. 1 illustrates one configuration of an optical film of the present invention comprising a filmy support, an ultraviolet absorbing layer; and a hardcoat layer.

DETAILED DESCRIPTION OF THE INVENTION

The present invention is described in detail below. Incidentally, the expression "from (numerical value 1) to (numerical value 2)" as used in the present invention for indicating a physical value, a characteristic value or the like means "(numerical value 1) or more and (numerical value 2) or less". Also, the term "(meth)acrylate" as used in the present invention means "at least either acrylate or methacrylate". The same applies to "(meth)acrylic acid" and the like.
<Optical Film>
[Polymer Containing Alicyclic Structure]

The polymer containing an alicyclic structure for used in the present invention has an alicyclic structure in a repeating unit of the polymer, and both a polymer containing an alicyclic structure in the main chain and a polymer containing an alicyclic structure in the side chain can be used.

Examples of the alicyclic structure include a cycloalkane structure and a cycloalkene structure. In view of thermal stability and the like, a cycloalkane structure is preferred. The number of carbon atoms constituting the alicyclic structure is not particularly limited but is usually from 4 to 30, preferably from 5 to 20, more preferably from 5 to 15. When the number of carbon atoms constituting the alicyclic structure is in this range, a transparent plastic film excellent in the heat resistance and flexibility can be obtained, and this can be preferably used as the filmy support of the optical film of the present invention.

The proportion of the alicyclic structure-containing repeating unit in the polymer containing an alicyclic structure may be appropriately selected according to the intended use but is usually 50 mass % or more, preferably 70 mass % or more, more preferably 90 mass % or more. If the proportion of the alicyclic structure-containing repeating unit is excessively small, heat resistance decreases and this is not preferred. The repeating unit other than the alicyclic structure-containing repeating unit in the polymer containing an alicyclic structure is appropriately selected according to the intended use.
[Specific Examples of Polymer Containing Alicyclic Structure]

Specific examples of the polymer containing an alicyclic structure include (i) a norbornene-based polymer, (ii) a monocyclic cycloolefin-based polymer, (iii) a cyclic conjugated diene-based polymer, (iv) a vinyl alicyclic hydrocarbon polymer, and a hydrogenation product of these polymers. Among these, a norbornene-based polymer is preferred in view of transparency and shapability.
(i) Norbornene-Based Polymer Specific examples of the norbornene-based polymer include a ring-opened polymer of a norbornene-based monomer, a ring-opened copolymer of a norbornene-based monomer with other ring-opening polymerizable monomers, a hydrogenation product of these polymers, an addition polymer of a norbornene-based monomer, and an addition copolymer of a norbornene-based monomer with other copolymerizable monomers. Among these, a hydrogenation product of a ring-opened (co)polymer of a norbornene-based monomer is preferred in view of transparency.

Examples of the norbornene-based monomer include bicyclo[2.2.1]hept-2-ene (trivial name: norbornene), tricyclo[4.3.0.1$^{2.5}$]deca-3,7-diene (trivial name: cyclopentadiene), 7,8-benzotricyclo[4.3.0.1$^{2.5}$]deca-3-ene (trivial name: methanotetrahydrofluorene), tetracyclo[4.4.0.1$^{2.5}$.1$^{7.10}$]dodeca-3-ene (trivial name: tetracyclododecene), and a derivative of these compounds, such as a derivative obtained by introducing a substituent into the ring. Examples of the substituent include an alkyl group, an alkenyl group, an alkoxycarbonyl group and a carboxyl group. A plurality of these substituents, which may be the same or different, may be bonded to the ring. One of these norbornene-based monomers may be used alone, or two or more kinds thereof may be used in combination.

Examples of other monomers ring-opening polymerizable with the norbornene-based monomer include monocyclic olefins such as cyclohexene, cycloheptene and cyclooctene, and a derivative thereof; and a cyclic conjugated diene such as cyclohexadiene and cycloheptadiene, and a derivative thereof.

The ring-opened polymer of a norbornene-based monomer and the ring-opened copolymer of a norbornene-based monomer with other monomers polymerizing the monomer(s) in the presence of a ring-opening polymerization catalyst. As for the ring-opening polymerization catalyst, those heretofore known can be used.

Examples of other monomers addition-copolymerizable with the norbornene-based monomer include an α-olefin having a carbon number of 2 to 20, such as ethylene and propylene, and a derivative thereof; a cycloolefin such as cyclobutene and cyclopentene, and a derivative thereof; and a non-conjugated diene such as 1,4-hexadiene. One of these monomers may be used alone, or two or more kinds thereof may be used in combination. Among these, an α-olefin is preferred, and ethylene is more preferred.

The addition polymer of a norbornene-based monomer and the addition copolymer of a norbornene-based monomer with other monomers copolymerizable with the norbornene-based monomer can be obtained by polymerizing the monomer(s) in the presence of an addition polymerization catalyst. As for the addition polymerization catalyst, those heretofore known can be used.

The hydrogenation product of a ring-opened polymer of a norbornene-based monomer or a ring-opened copolymer of a norbornene-based monomer with other monomers ring-opening polymerizable with the norbornene-based monomer can be obtained by hydrogenating the carbon-carbon unsaturated bond preferably to a degree of 90% or more by using a known hydrogenation catalyst.

Examples of the norbornene-based (co)polymer include "ZEONOR" and "ZEONEX", trade names, produced by ZEON Corp.; "ARTON", trade name, produced by JSR Corp.; "OPTOREZ", trade name, produced by Hitachi Chemical Co., Ltd.; and "APEL", trade name, produced by Mitsui Chemicals, Inc.

(ii) Monocyclic Cycloolefin-Based Polymer

Examples of the cyclic conjugated diene-based polymer include a addition polymer of cyclohexene, cycloheptene or cyclooctene.

(iii) Cyclic Conjugated Diene-Based Polymer

Examples of the cyclic conjugated diene-based polymer include a polymer obtained by the 1,2-addition polymerization or 1,4-addition polymerization of cyclopentadiene or cyclohexadiene.

(iv) Vinyl Alicyclic Hydrocarbon Polymer and Hydrogenation Product Thereof

The vinyl alicyclic hydrocarbon polymer is a polymer having a repeating unit derived from vinylcycloalkane or vinylcycloalkene. Examples of the vinyl alicyclic hydrocarbon polymer include a polymer of a vinyl alicyclic hydrocarbon compound such as vinylcyclohexene, and a hydrogenation product thereof; and a polymer obtained by hydrogenating the aromatic ring moiety of a polymer of a vinyl aromatic hydrocarbon compound such as styrene and α-methylstyrene. Also, the vinyl alicyclic hydrocarbon polymer may be a copolymer such as random or block copolymer of a vinyl alicyclic or aromatic hydrocarbon compound with other monomers copolymerizable with that monomer, or a hydrogenation product thereof.

As for the molecular weight of the polymer having an alicyclic structure of the present invention, the weight average molecular weight in terms of polyisoprene or polystyrene as measured by gel permeation chromatography using cyclohexane as the solvent (using toluene when the polymer does not dissolve) is usually from 10,000 to 300,000, preferably 20,000 to 200,000. When the molecular weight is in this range, the transparent plastic film is highly balanced between mechanical strength and shaping proccessability and is suitable as the filmy support of the optical film of the present invention.

The glass transition temperature of the polymer having an alicyclic structure of the present invention may be appropriately selected according to the intended use but is preferably 80° C. or more, more preferably from 100 to 250° C. When the glass transition temperature is in this range, the transparent plastic film exhibits excellent durability without causing deformation or stress on use at a high temperature and is suitable as the filmy support of the optical film of the present invention.

[Filmy Support]

The filmy support comprising a polymer having an alicyclic structure of the present invention can be obtained by shaping the above-described polymer into a film form by a known shaping method.

The method for the shaping into a film form includes a solution casting method and a melt-extrusion shaping method. Of these, a melt-extrusion shaping method is preferred in view of productivity and also in that the volatile component content in the film or the film thickness can be reduced in the unevenness. The melt-extrusion shaping method includes a method using a die such as T-die and an inflation method, and a method using a T-die is preferred because of excellent thickness precision.

In the case of employing a method using a T-die as the method for shaping a film, the melt temperature in the extruder having a T-die is preferably set to a temperature higher than the glass transition point of the polymer used by 80 to 180° C., more preferably by 100 to 150° C. If the melt temperature in the extruder is excessively low, the fluidity of the polymer may decrease, whereas if the melt temperature is too high, the polymer may deteriorate.

Before the shaping into a film form, the polymer used is preferably subjected to preliminary drying. The preliminary drying is performed, for example, by forming the raw materials into a pellet and drying it by a hot-air drier. The drying temperature is preferably 100° C. or more, and the drying time is preferably 2 hours or more. By virtue of performing the preliminary drying, the amount of volatile components in the film can be reduced. Furthermore, the polymer extruded can be prevented from foaming.

The polymer used preferably has a saturated water absorbency of less than 0.05%. When a polymer having a saturated water absorbency of less than 0.05% is used, at the time of forming a stack on the obtained filmny support, moisture is not emitted to deteriorate the quality or decrease the productivity. Also, the film can be prevented from shrinking due to moisture absorption and, resultantly, a layer stacked is not separated from the filmy support. Particularly, when the optical film is used in a large-screen liquid crystal display device, the image quality can be prevented from worsening which is caused by the dimensional change due to moisture absorption.

The thickness of the filmy support is preferably from 5 to 200 μm, more preferably from 30 to 120 μm, still more preferably from 40 to 80 μm. When the thickness of the substrate film is not less than this lower limit, a problem such as weakening of the film strength hardly occurs, whereas when it is not more than the upper limit, a trouble such as excessive increase in the mass, which is disadvantageous in use particularly for a large television of 20 inches or more, is scarcely caused and this is preferred.

The moisture permeability is described in detail below.

As for the measuring method of moisture permeability, the methods described in Measurement of Vapor Permeation (mass method, thermometer method, vapor pressure method, adsorption method) of "Kobunshi no Bussei II (Physical Properties II of Polymers)" of *Kobunshi Jikken Koza* 4 (*Lecture on Polymer Experimentation* 4), pp. 285-294, Kyoritsu Shuppan Co., Ltd., may be appropriately used.

[Measurement Method 1 of Moisture Permeability]

Film samples (70 mmφ) according to the present invention each is moisture-conditioned at 60° C. and 95% RH for 24 hours, and the water volume (g/m$^2$) per unit area is calculated in terms of (moisture permeability=mass after moisture conditioning−mass before moisture conditioning) from the difference in the mass between before and after moisture conditioning by using a moisture-permeable cup according to JIS Z-0208. Correction of the moisture permeability value by using a blank cup containing no moisture absorbent is not performed.

The moisture permeability of commercially available cellulose acetate films as measured by the measuring method above is generally from 1,400 to 1,500 g/m$^2$·day with a thickness of 80 μm under the above-described conditions.

On the other hand, the upper limit of the moisture permeability of the filmy support for use in the present invention is preferably 300 g/m²·day or less, more preferably 200 g/m²·day or less, still more preferably 150 g/m²·day or less. If the moisture permeability is higher than this upper limit, when a polarizing plate is produced, unevenness is generated in the displayed image resulting from change in the size of the filmy support due to change in the temperature or humidity on use for a long time, and the effect of reducing the unevenness is low. The lower limit is not particularly limited but is preferably more than 0 g/m²·day and in view of productivity at the processing of a polarizing plate, the lower limit is preferably 5 g/m²·day or more, more preferably 1 g/m²·day or more. Accordingly, the optical film of the present invention preferably has a moisture permeability of 5 to 150 g/m²·day. When the moisture permeability is in this range, the performance (polarizing degree, single plate transmittance) as a polarizing plate is not worsened and the displayed image can be prevented from becoming uneven due to change in the size of the polarization film, which is caused by the change in the temperature or humidity on use for a long period.

[Ultraviolet Absorbing Layer]

The ultraviolet absorbing layer for use in the present invention contains a substance capable of absorbing light in the region of 200 to 340 nm and thereby prevents deterioration by an ultraviolet ray. Specifically, the beam transmittance in the region of 200 to 340 nm is 5% or less. Also, the transmittance to light at a wavelength of 380 nm is preferably from 0 to 50%. Furthermore, since the optical film is used in a display device, the transmittance at 600 nm (a representative wavelength of the visible light region) is preferably high.

[Ultraviolet Absorbent]

As for the ultraviolet absorbent used in the present invention, a polymer particle ultraviolet absorbent and an inorganic particle ultraviolet absorbent are preferred in terms of less vaporization of an ultraviolet absorbent at the coating of a hardcoat layer and good adhesion between the ultraviolet absorbing layer and the filmy support comprising a polymer having an alicyclic structure as well as between the ultraviolet absorbing layer and the hardcoat layer.

(Inorganic Particle Ultraviolet Absorbent)

The inorganic particle ultraviolet absorbent for use in the present invention is preferably a fine particulate metal oxide. The fine particulate metal oxide indicates a metal oxide having an average primary particle diameter of 1 to 100 nm and having an ultraviolet-blocking effect. Examples thereof include a fine particulate titanic oxide, a fine particulate zinc oxide, a fine particulate cerium oxide and a fine particulate iron oxide. One or more of these fine particulate metal oxides are used, and use of two or more kinds thereof in combination is preferred. For example, a combination of fine particulate titanium oxide and fine particulate zinc oxide is preferred. The particle either sharp or broad. The shape of the fine particulate metal oxide is not particularly limited and may be, for example, spherical, needle-like, bar-like, spindle-like, infinite or plate-like. The crystal form is also not particularly limited and may be, for example, amorphous, rutile-type or anatase-type.

The fine particulate metal oxide is preferably subjected in advance to a conventionally known surface treatment such as fluorine compound treatment, silicone treatment, silicone resin treatment, pendant treatment, silane coupling agent treatment, titanium coupling agent treatment, oil agent treatment, N-acylated lysine treatment, polyacrylic acid treatment, metal soap treatment, amino acid treatment, inorganic compound treatment, plasma treatment and mechanochemical treatment. In particular, a water repellent treatment with one or more surface treating agents selected from silicone, silane, a fluorine compound, an amino acid-based compound and a metal soap is preferred.

Examples of the silicone treatment include a heat-coating treatment with methyl hydrogen polysiloxane, and examples of the silane treatment include an alkylsilane treatment. Examples of the fluorine compound include a perfluoroalkylphosphoric ester, a perfluoropolyether, a perfluoroalkylsilicone, a perfluoroalkyl•polyether co-modified silicone and a perfluoroalkylsilane; examples of the amino acid-based compound include N-lauroyl-L-lysine; and examples of the metal soap include aluminum stearate.

Furthermore, in the fine particulate metal oxide for use in the present invention, a metal oxide layer selected from silica and alumina is preferably provided on the particle surface so as to suppress the photocatalytic activity. In particular, the fine particulate metal oxide is preferably coated with silica or alumina and then subjected to the above-described water repellent surface treatment. The photocatalytic activity may also be suppressed using the methods described in JP-A-2001-191873, JP-A-2005-272267 and JP-A-2005-272270.

As for the commercially available fine particulate metal oxide, examples of the fine particulate zinc oxide include "FINEX-25", "FINEX-50" and "FINEX-75" {all produced by Sakai Chemical Industry Ltd.}; "MZ500" series and "MZ700" series {both produced by TAYCA Corp.}; and "ZnO-350" {produced by Sumitomo Osaka Cement Co., Ltd.). Examples of the fine particulate titanium oxide include "TTO-55, 51, S, M, D" series {all produced by Ishihara Sangyo Kaisha Ltd.}; and "JR" series and "JA" series {all produced by TAYCA Corp, Ltd.}. The fine particulate cerium oxide includes a high-purity cerium oxide commercially available from Nikki Corp. or Seimi Chemical Corp. Among these, titanium oxide is preferred.

The average primary particle diameter or average primary short-axis particle diameter of the titanium oxide for use in the present invention is preferably from 1 to 45 nm, more preferably from 3 to 40 nm, still more preferably from 5 to 30 nm. Here, the term "average primary particle diameter" is an average value of equivalent-sphere diameters when the primary particle has a spherical or nearly spherical shape, and the "average primary short-axis particle diameter" is an average value of short-axis particle diameters when the primary particle has a cylindrical or spindle-like shape. In the case of a particle having a spindle-like or cylindrical shape (preferably a spindle-like shape), the long-axis diameter is preferably from 3 to 200 nm, more preferably from 5 to 150 nm, still more preferably from 10 to 100 nm. The long-axis diameter/short-axis diameter ratio (hereinafter referred to as an "aspect ratio") is preferably from 2 to 10, more preferably from 2.5 to 8, still more preferably from 3 to 6.

(Surface Treating Agent)

The fine particulate titanium oxide for use in the present invention can be used by surface-treating it with aluminum oxide and/or silicon oxide. The amount of aluminum oxide used is preferably from 1 to 30 mass %, more preferably from 2 to 20 mass % based on the titanium oxide. The amount of silicon oxide used is also from 1 to 30 mass %, preferably front 2 to 20 mass %. When the amount of the surface treating agent is not less than the lower limit above, dispersion failure or precipitation of the dispersion in aging hardly occurs, and when it is not more than the upper limit, the amount of titanium oxide is substantially decreased and a disadvantageous result such as reduction in the objective ultraviolet absorbing capability is less caused and this is preferred.

In addition, a fine particulate titanium oxide surface-treated with various surface treating agents irrespective of an inorganic material or an organic material may also be preferably used. Preferred examples of the inorganic surface treating agent include zirconium oxide and zinc oxide, and preferred examples of the organic surface treating agent include siloxane, stearic acid and trimethylolpropane.

The amount of the treating agent used is preferably from 3 to 45% (by mass), more preferably from 5 to 35 mass %, based on the titanium oxide. The dispersibility or the like may be improved by using the treating agent in a larger amount, but the amount of titanium oxide is relatively decreased to cause reduction in the absorption of an ultraviolet light and the effect of photostability as an expected purpose may be impaired. Therefore, an appropriate amount of the treating agent is preferably selected so that the above-described two performances both can be satisfied.

The surface treatment of titanium oxide may be performed, for example, as follows. The synthesized titanium oxide is dispersed using, for example, a phosphate such as sodium hexametaphosphate, and the pH is adjusted according to the solubility of the surface treating agent. In this dispersion, aluminum oxide and/or silicon oxide in the form of a suspension is mixed, and the resulting mixture is adjusted to a pH at which the solubility of the surface treating agent decreases. As a result, the surface treating agent deposits on the titanium oxide surface and adheres thereto. If desired, the add-on amount or form can be varied, for example, by adjusting the concentrations of the surface treating agent and titanium oxide, by adjusting the reaction temperature or by performing a high-temperature treatment after the reaction.

The coverage of the ultraviolet absorbent for use in the present invention may be selected according to the purpose, but the ultraviolet absorbent is preferably used such that the titanium oxide amount becomes from 0.01 to 20 g/m². When the amount used is large, the absorption of an ultraviolet ray increases, and when it is not more than the upper limit above, reduction in the transparency can be suppressed. The amount is more preferably from 0.02 to 10 g/m², still more preferably from 0.05 to 2 g/m².

The rutile crystallinity which greatly affects the effect of the present invention is described below. In the calculation of the rutile crystallinity, titanium oxide to be measured and silicon (specifically, silicon oxide or the like is used) are mixed at a ratio of 1:5 by mass. Thereafter, the ratio between the peak area of the rutile (1,1,0) plane and the peak area of silica is determined by X-ray diffraction. "MT600B" {fine particulate titanium oxide, produced by TAYCA Corp., average primary particle diameter: 50 nm, non-surface-treated} is measured as a standard sample and by taking the obtained value as a rutile crystallinity of 100%, the ratio to each measured sample is calculated. In the present invention, this ratio is defined as the rutile crystallinity. When the rutile crystallinity is large, the crystal is firmly formed and the chemical resistance, weather resistance and the like are excellent. On the contrary, if the rutile crystallinity is low, the chemical resistance or weather resistance decreases. Also, the refractive index varies depending on the rutile crystallinity and therefore, in the present invention, the rutile crystallinity is from 20 to 70%, preferably from 30 to 60%, more preferably from 35 to 55%. Within this range, the film when irradiated with high-intensity light is free from cracking caused by the effect of active oxygen or the like or coloration due to oxidation of an organic compound present together.

The rutile crystallinity can be controlled by selecting, out of the production process of a fine particulate titanium oxide described later, the firing temperature after surface treatment, the drying temperature and time, and the temperature, concentration or time in the post-treatment (leaching) with an acid and an alkali. In relation therewith, the rutile crystallinity can also be controlled by the particle diameter.

The titanium oxide usable in the present invention may be produced using various methods but can be produced, for example, by the neutralization hydrolysis of titanium salt, the neutralization of sodium titanate, the hydrolysis of titanium alkoxide, or the vapor-phase decomposition of titanium alkoxide.

Describing specifically the neutralization hydrolysis method of titanium salt, the titanium oxide can be produced by a process of, after the hydrolysis of titanium tetrachloride, passing through firing, grinding/granulating, surface treatment, washing, drying and finishing pulverization. In the neutralization method of sodium titanate, a leaching treatment with an alkali and an acid is performed after hydrolysis and subsequently, a surface treatment step is performed without passing through a firing step. This production process not passing through firing is defined as a wet process.

The raw material titanium oxide usable in the present invention may be produced by a firing process or a wet process, but the cylindrical or spindle-like titanium oxide is generally prepared by a wet process. The difference in the particle titanium tetrachloride, the hydrolysis rate, the firing temperature, the drying temperature, the conditions (concentration, time and temperature) in the post-treatment (leaching) with an acid and an alkali, or the surface treating agent (kind and amount). The titanium oxide prepared by the wet process is characterized by having easy dispersibility. On the other hand, in the firing method, the crystal system or the amount of the surface treating agent can be adjusted by the firing temperature or time. The titanium oxide prepared by the firing process has excellent weather resistance.

(Polymer Particle Ultraviolet Absorbent)

The ultraviolet-absorbing polymer particle which can be used in the present invention is not particularly limited in its constituent components as long as the polymer particle has an absorption capability in the ultraviolet region of 200 to 340 nm, and a component having a known ultraviolet absorbent mother nucleus may be used. Examples of the ultraviolet absorbent mother nucleus include benzotriazole-based, benzophenone-based, phenyl salicylate-based and triazine-based mother nuclei.

{Ultraviolet Absorbing Monomer (a)}

In the present invention, the ultraviolet absorbing monomer (a) which can used as a raw material of the polymer particle ultraviolet absorbent is preferably a monomer where a 2-hydroxybenzophenone derivative represented by the following formula (1) and/or a 2-hydroxyphenylbenzotriazole derivative represented by the following formula (2) are bonded as a side chain to the main chain of a vinyl compound.

Formula (1):

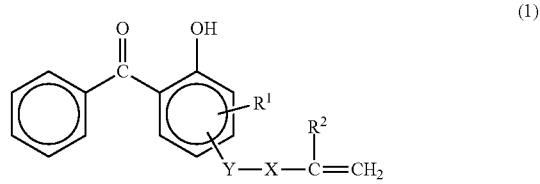

wherein $R^1$ represents hydrogen, a lower alkyl group having a carbon number of 1 to 6, or an alkoxy group, Y represents a lower alkylene group or oxyalkylene group having a carbon number of 1 to 10 or a single bond (in this case, X is bonded directly to the benzene ring), X represents an ester bond, an amido bond, an ether bond or a urethane bond, and $R^2$ represents a hydrogen atom or a lower alkyl group.

The ultraviolet absorbing monomer of formula (1) can be obtained, for example, by reacting an ultraviolet absorbing compound having a functional group such as BP—Y—OH (BP: 2-hydroxybenzophenone skeleton) with a polymerizable vinyl compound having a functional group such as $CH_2=CR^2$—COOH, and bonding and introducing an ultraviolet absorbing compound residue into the polymerizable vinyl compound through an ester bond X(—COO—).

Specific examples of the ultraviolet absorbing monomer of formula (1) include 2-hydroxy-4-acryloyloxybenzophenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone and 2-hydroxy-4-(2-methyl-2-acryloyloxy)ethoxybenzophenone.

Formula (2):

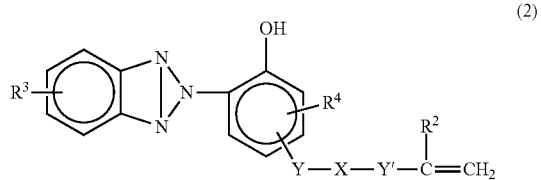

(2)

wherein $R^3$ represents a hydrogen atom, a halogen atom or a methyl group, $R^4$ represents a hydrogen atom or a hydrocarbon group having a carbon number of 1 to 6, Y represents an alkylene or oxyalkylene group having a carbon number of 1 to 10 or a single bond (in this case, X is bonded directly to the benzene ring), X represents an ester bond, an amido bond, an ether bond or a urethane bond, Y' represents an alkylene or aminoalkylene group having a carbon number of 1 to 8 or a single bond (in this case, X is bonded directly to C), and $R^2$ represents a hydrogen atom or a lower alkyl group.

Specific examples of the ultraviolet absorbing monomer of formula (2) include 2-[2'-hydroxy-5'-(methacryloyloxy)ethylphenyl]-2H-benzotriazole, 2-[2'-hydroxy-5'-(methacryloyloxy)phenyl]benzotriazole, 2-[2'-hydroxy-5'-(acryloyloxy)phenyl]benzotriazole, 2-[2'-hydroxy-3'-tert-butyl-5'-(methacryloyloxy)phenyl]benzotriazole, 2-[2'-hydroxy-3'-methyl-5'-(acryloyloxy)phenyl]benzotriazole, 2-[2'-hydroxy-5'-(methacryloyloxypropyl)phenyl]-5-chlorobenzotriazole, 2-[2'-hydroxy-5'-(methacryloyloxyethyl)phenyl]benzotriazole, 2-[2'-hydroxy-5'-(acryloyloxyethyl)phenyl]benzotriazole, 2-[2'-hydroxy-3'-tert-butyl-5'-(methacryloyloxyethyl)phenyl]benzotriazole, 2-[2'-hydroxy-3'-methyl-5'-(acryloyloxyethyl)phenyl]benzotriazole, 2-[2'-hydroxy-5'-(methacryloyloxypropyl)phenyl]-5-chlorobenzotriazole, 2-(2'-hydroxy-5'-(acryloyloxybutyl)phenyl]-5-methylbenzotriazole and [2-hydroxy-3-tert-butyl-5-(acryloyloxyethoxycarbonylethyl)phenyl]benzotriazole.

The polymer particle ultraviolet absorbent of the present invention uses a combination of two or more kinds of monomers differing in the ultraviolet absorbing characteristics, such as a combination of a 2-hydroxybenzophenone derivative represented by formula (1) and a 2-hydroxyphenylbenzotriazole derivative represented by formula (2), whereby the ultraviolet absorbing effect can be more enhanced. The weight ratio of formula (1) and formula (2) is preferably from 0/100 to 100/0, more preferably from 20/80 to 80/20.

{Copolymerizable Reactive Monomer (b)}

The reactive monomer (b) copolymerizable with the ultraviolet absorbing monomer (a) (this reactive monomer is hereinafter sometimes referred to as a "comonomer") is an alkyl (meth)acrylate, an acrylonitrile, an alkyl vinyl ether, a vinyl carboxylate, styrene or the like. The number of carbon atoms in the alkyl group of the reactive monomer is not particularly limited but is preferably from 1 to 18. Specific examples of the comonomer include the followings, but the present invention is not limited thereto:

an acrylic acid, an alkylacrylic acid (e.g., methacrylic acid), an ester or amide derived from an acrylic acid (e.g., acrylamide, methacrylamide, n-butylacrylamide, tert-butylacrylamide, diacetoneacrylamide, methyl acrylate, ethyl acrylate, n-propyl acrylate, n-butyl acrylate, tert-butyl acrylate, isobutyl acrylate, 2-ethylhexyl acrylate, n-octyl acrylate, lauryl acrylate, 2-ethoxyethyl acrylate, 2-methoxyethyl acrylate, methyl methacrylate, ethyl methacrylate, n-butyl methacrylate, and b-hydroxymethacrylate), a vinyl ester (e.g., vinyl acetate, vinyl propionate, vinyl laurate), acrylonitrile, methacrylonitrile, an aromatic vinyl compound (for example, a styrene and a styrene derivative such as vinyltoluene, vinylacetophenone, sulfostyrene), an itaconic acid, a citraconic acid, a crotonic acid, vinylidene chloride, a vinyl alkyl ether (e.g., vinyl ethyl ether), a maleic acid ester, an N-vinyl-2-pyrrolidone, an N-vinylpyridine, a 2- or 4-vinylpyridine, and a polymerizable functional group-containing sulfonic acid (e.g., acrylamido-2,2'-dimethylpropanesulfonic acid, 2-sulfoethyl methacrylate, 3-sulfopropyl methacrylate). Among these monomers, an acrylic acid ester, a methacrylic acid ester and an aromatic vinyl compound are preferred.

Specific examples of the particularly preferred comonomer include butyl acrylate, 2-ethylhexyl acrylate, 2-ethoxyethyl acrylate, 2-methoxyethyl acrylate, acrylic acid, methacrylic acid, acrylamide, 2-hydroxyethyl acrylate, vinyl acetate, styrene, N-vinyl-2-pyrrolidone, 2-sulfoethyl methacrylate and a metal salt thereof, and 2-acrylamido-2-methylpropanesulfonic acid and a metal salt thereof.

The monomer constituting the polymer particle for use in the present invention preferably contains a crosslinking monomer having a plurality of polymerizable functional groups in its molecule.

Specific examples of the crosslinking monomer include aromatic monomers such as divinylbenzene, trivinylbenzene, divinyltoluene, divinylxylene, ethyldivinylbenzene, divinylnaphthalene, divinylalkylbenzenes, divinylphenanthrene, divinylbiphenyl, divinyldiphenylmethane, divinylbenzyl, divinylphenylether and divinyldiphenylsulfide; an oxygen-containing monomer such as divinylfuran; a sulfur-containing monomer such as divinylsulfide and divinylsulfone; an aliphatic monomer such as butadiene, isoprene and pentadiene; a (meth)acrylate of a polyhydric alcohol, such as ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, octanediol di(meth)acrylate, decanediol di(meth)acrylate, trimethylolpropane di(meth)acrylate, trimethylolpropane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate and dipentaerythritol tetra(meth)acrylate; a (meth)acrylate of a polyhydric alcohol, such as hydroquinone, catechol, resorcinol and sorbitol; a polyamine derivative such as N,N'-methylenebis(meth)acrylamide and triallylamine; and an unsaturated alcohol ester of a polyacid, such as triallylisocyanurate, tetra-allyloxyethane and diallylphthalate. One of these monomers may be used alone, or two or more thereof may be used in combination.

Among these, preferred are ethylene glycol di(meth)acrylate, trimethylolpropane tri(meth)acrylate, pentaerythritol tri(meth)acrylate, pentaerythritol tetra(meth)acrylate, divinylbenzene, trivinylbenzene and divinylnaphthalene.

The copolymerization ratio (a)/(b) between the ultraviolet absorbing monomer (a) and the reactive monomer (b) is, in terms of mass ratio, preferably from 5/95 to 100/0, more preferably from 30/70 to 90/10, and most preferably from 40/60 to 80/20. As for the reactive monomer (b), a monofunctional monomer (bs) and the above-described polyfunctional crosslinking monomer (bm) can be used in combination. The mixing ratio (bs)/(bm) of these two monomers is, in terms of mass ratio, preferably from 100/0 to 0/100, more preferably from 95/5 to 10/90, and most preferably from 90/10 to 70/30. When the constitutional ratio of monomers is in this range, a polymer particle excellent in terms of stability of the polymer particle in the coating solution, adhesion of the film coating to the support and adhesion of the film coating to the hardcoat layer can be obtained.

The ultraviolet-absorbing polymer particle for use in the present invention may be produced by any method such as suspension polymerization, emulsion polymerization, soap-free emulsion polymerization, dispersion polymerization and seed polymerization. As for these methods, there may be referred to the methods described, for example, in Takayuki Ohtsu and Masanobu Kinoshita, *Kobunshi Gousei no Jikken Hou (Experimental Method of High Molecular Synthesis)*, pages 130, 146 and 147, Kagaku-Dojin Publishing Co., Inc. (1972), *Gosei Kobunshi (Synthetic Polymer)*, 1, pp. 246-290, *Gosei Kobunshi (Synthetic Polymer)*, 3, pp. 1-108, Japanese Patent Nos. 2,543,503, 3,508,304, 2,746,275, 3,521,560 and 3,580,320, JP-A-10-1561, JP-A-7-2908, JP-A-5-297506 and JP-A-2002-145919.

For example, the emulsion polymerization and suspension polymerization include a method of microparticulating and polymerizing a monomer in a water medium.

Examples of the surfactant for use in the emulsion polymerization include an anionic surfactant such as dodecylbenzenesulfonate, dodecylsulfate, laurylsulfate and dialkylsulfosuccinate; and a nonionic surfactant such as polyoxyethylene nonylphenyl ether and polyethylene glycol monostearate. Also, polyvinyl alcohol, sodium polyacrylate, a hydrolysate of styrene-maleic acid copolymer, sodium alginate, and polymers and oligomers such as water-soluble cellulose derivative may be used as a protective colloid-type dispersion stabilizer.

In the suspension polymerization method where an addition-polymerization reaction started by an oil-soluble polymerization initiator is performed using water as a dispersion medium in the presence of inorganic salts and/or a dispersion stabilizer, there may be used water-soluble salts such as sodium chloride, potassium chloride, calcium chloride and magnesium sulfate. Examples of the polymerization initiator include an azobis compound {e.g., azobisisobutyronitrile, azobis(cyclohexane-1-carbonitrile)}, and peroxides (e.g., benzoyl peroxide, tert-butyl peroxide).

Furthermore, a so-called multi-stage polymerization method where a fine polymer is previously prepared and then impregnated with a monomer to make the particle fat, is also preferred.

In the present invention, a core/shell-type polymer particle is preferably used. In order to enhance the light fastness or thermal stability of the ultraviolet absorbent itself, the ultraviolet absorbent is preferably contained in the core part of the polymer particle and protected from outside. Also, the adhesion to the support or hardcoat or the durability can be improved by controlling the Tg, molecular weight or composition of the polymer in the core part. Examples of the core/shell-type particle include a UV absorbent-containing microemulsion, "SE-2538E", produced by Taisei Fine Chemical Co., Ltd.

The shape of the polymer particle may be either really spherical or amorphous. As for the particle size distribution, a monodisperse particle is preferred in view of uniformity of the coated surface state, adhesion on the interface between the film coating and the support, or the like. For example, when a particle having a particle diameter 20% or more larger than the average particle diameter is designated as a coarse particle, the proportion of the coarse particle is preferably 1% or less, more preferably 0.1% or less, of the total particle number.

The particle size of the polymer particle for use in the present invention may be from 10 to 3,000 nm but is preferably from 10 to 2,000 nm, more preferably from 30 to 1,000 nm, and most preferably from 30 to 300 nm.

The molecular weight of the ultraviolet absorbent is approximately from 1,000 to 1,000,000, preferably on the order of 100,000 to 1,000,000.

Specific examples of the ultraviolet-absorbing polymer which can be used in the present invention include P-1 to P-27 described in JP-A-6-82962, and IP-1 to IP-53 described in JP-A-9-34057.

The coverage of the ultraviolet absorbent for use in the present invention may be selected according to the purpose, but the ultraviolet absorbent is preferably used such that the amount of the ultraviolet-absorbing polymer becomes from 0.01 to 20 g/m$^2$. When the amount used is large, the absorption of an ultraviolet ray increases, and when it is not more than the upper limit above, reduction in the transparency can be suppressed. The amount is more preferably from 0.02 to 10 g/m$^2$, still more preferably from 0.05 to 2 g/m$^2$.

[Binder for Fixing Particle]

In the ultraviolet absorbing layer which can be used in the present invention, in addition to the metal oxide particle or polymer particle, a binder for fixing the particle may be used.

The binder is preferably, for example, a urethane-based polymer, a reactive functional group-containing silicone compound, an olefin-based polymer, a vinyl ester-based latex, a (meth)acrylic acid-based latex, a styrene-based latex, a hydrophilic polymer or an ultraviolet-curable or thermosetting polymer compound, more preferably an olefin-based polymer, a vinyl ester-based latex, a (meth)acrylic acid-based latex, a styrene-based latex or a hydrophilic polymer.

(Olefin-Based Polymer)

The olefin-based polymer is not particularly limited and may be sufficient if it is a polymer having an olefin-based double bond containing carbon, hydrogen, oxygen or nitrogen. Examples thereof include ethylene, propylene, butene and butadiene. These may be a homopolymer or a copolymer of two or more species. In particular, when the compound used has a group having high polarity, such as hydroxyl group, carboxyl group, amino group, isocyanate group, nitro group and carbonyl group, in the side chain or at the terminal, high adhesion to the substrate and hardcoat layer is exhibited.

The ultraviolet absorbing layer of the present invention using an olefin-based polymer as the binder can be prepared by dissolving the polymer in an appropriate solvent by means of an appropriate mixing device such as homomixer.

(Silicone Compound Having Reactive Functional Group)

Another preferred example of the binder for use in the ultraviolet absorbing layer includes a silicone compound having a reactive functional group. Examples of the silicone compound having a reactive functional group include an isocyanate group-containing alkoxysilanol compound, an amino group-containing alkoxysilanol compound, a mercapto group-containing alkoxysilanol compound, a carboxy group-containing alkoxysilanol compound, an epoxy group-containing alkoxysilanol compound, a vinyl-type unsaturated group-containing alkoxysilanol compound and a halogen group-containing alkoxysilanol compound. Among these various alkoxysilanol compounds, an amino group-containing alkoxysilanol compound is preferred.

Also, other additives may be added to the reactive functional group-containing silicone compound. Examples of the additive include a tackifier such as terpene resin, phenol resin, terpene-phenol resin, rosin resin and xylene resin, an ultraviolet absorbent, an antioxidant and a stabilizer such as heat-resistant stabilizer.

Incidentally, when the surface of the filmy support containing a polymer having an alicyclic structure is previously subjected to a surface treatment such as corona treatment, glow discharge treatment and low UV treatment, this affords enhancement of the adhesion between the filmy support and the ultraviolet absorbing layer containing the silicone compound having a reactive functional group.

Furthermore, in the reactive functional group-containing silicone compound, a catalyst of titanium type, tin type or the like may added so as to increase the reactivity of the silicone compound. By virtue of adding such a catalyst, strong adhesion to the hardcoat layer or filmy support can be obtained.
(Solvent)

The solvent is not particularly limited, and examples thereof include ketones such as methyl ethyl ketone, acetone and methyl isobutyl ketone; esters such as methyl xylene; ethers such as diethyl ether and tetrahydrofuran; and alcohols such as methanol, ethanol and isopropanol. Particularly, when a solvent which dissolves or swells a cycloolefin-based film, such as aromatic solvent (e.g., toluene, xylene), chlorine-based solvent (e.g., dichloromethane, carbon tetrachloride), hydrocarbon-based solvent (e.g., n-hexane, cyclohexane) and ketone-based solvent (e.g., cyclohexanone, methyl isobutyl ketone), is used, interaction with the cycloolefin-based film is intensified to bring about higher adhesion to the "filmy support comprising a polymer having an alicyclic structure" for use in the present invention and also, the interlayer boundary becomes less distinct, as a result, interference fringe is liable to disappear. The amount of the solvent used is, for example, approximately from 5 to 70 parts by mass per 100 parts by mass of the solid content of the ultraviolet absorbent or binder/
(Various Latexes)

In another preferred example of the ultraviolet absorbing layer, an ultraviolet absorbing layer using an acrylic acid ester-based latex, a methacrylic acid-based latex or a styrene-based latex as the binder may be formed on a filmy support mainly comprising a polymer having an alicyclic structure. The latex used may be a copolymer latex obtained by emulsion-polymerizing a monomer mixture comprising (a) a diolefin-based monomer, (b) a vinyl monomer and (c) a monomer having two or more vinyl groups, acryloyl groups, methacryloyl groups or allyl groups within one or more molecules, in the presence of a polymer chain transfer agent comprising (d) an α-methylstyrene dimer and other polymerization chain transfer agents.

Examples of the diolefin monomer (a) which is one monomer forming the copolymer include a conjugated diene such as butadiene, isoprene and chloroprene. Among these, butadiene is preferred.

In the present invention, the vinyl monomer (b) which is a second component of the copolymer used as the binder for forming the ultraviolet absorbing layer may be any monomer as long as it contains a vinyl group, but preferred examples thereof include styrene, acrylonitrile, methyl methacrylate, vinyl chloride, vinyl acetate, derivatives thereof, an alkyl ester of acrylic acid, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylolated acrylamide, N-methylolated methacrylamide, vinylisocyanate and allyl isocyanate.

Examples of the styrene derivative include methylstyrene, dimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstryrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene and methyl vinylbenzoate.

Among the acrylic acid esters, methyl methacrylate, glycidyl(meth)acrylate and 2-hydroxyethyl(meth)acrylate are preferred.

Examples of the monomer (c) having two or more vinyl groups, acryloyl groups, methacryloyl groups or allyl groups within the molecule, which is a third component of the copolymer used as the binder in the present invention, include a so-called crosslinking agent usually added at the polymerization of a vinyl monomer, such as divinylbenzene, 1,5hexadiene-3-in, hexatriene, divinyl ether, divinylsulfone, diallyl phthalate, diallyl carbinol, diethylene glycol dimethacrylate, trimethylolpropane trimethacrylate and trimethylolpropane dimethacrylate.

The content of the diolefin monomer (a) in the copolymer above for use in the present invention is preferably from 10 to 60 mass %, more preferably from 15 to 40 mass %, based on the entire copolymer. The content of the vinyl monomer (b) is preferably from 90 to 40 mass % of the entirety and out of the vinyl monomers, the content of styrenes is preferably from 70 to 40 mass % based on the entire copolymer. The content of the monomer (c) having two or more vinyl groups, acryloyl groups, methacryloyl groups or allyl groups within the molecule is preferably from 0.01 to 10 mass %, more preferably from 0.1 to 5 mass %, based on the total of the diolefin monomer (a) and the vinyl monomer (b).

The α-methylstyrene dimer in the polymerization chain transfer agent (d) has isomers: (i) 2-4-diphenyl-4-methyl-I-pentene, (ii) 2-4-diphenyl-4-methyl-2-pentene and (iii) 1-1-3-trimethyl-3-phenylindane. The α-methylstyrene dimer preferably has a composition comprising 40 mass % or more of the component (i) and 60 mass % or less of the component (ii) and/or the component (iii), more preferably a composition comprising 50 mass % or more of the component (i) and 50 mass % or less of the component (ii) and/or the component (iii), still more preferably a composition comprising 70 mass % or more of the component (i) and 30 mass % or less of the component (ii) and/or the component (iii). As the compositional ratio of the component (i) increases, the chain transfer effect becomes higher.

The α-methylstyrene dimer may contain an impurity, for example, unreacted α-methylstyrene, an α-methylstyrene oligomer except for the components (i), (ii) and (iii) above, or an α-methylstyrene polymer, within the range not impairing the object of the present invention. In the case of using an α-methylstyrene dimer, an α-methylstyrene dimer synthesized may be used in the unpurified state if the purpose of its use is not impaired.

The proportion of the α-methylstyrene dimer in the polymerization chain transfer agent (d) is generally from 2 to 100 mass %, preferably from 3 to 100 mass %, more preferably from 5 to 95 mass %. When the proportion of the α-methylstyrene dimer is not less than this lower limit, a copolymer latex excellent in the adhesion strength and antiblocking property can be obtained and this is preferred. Also, by using the α-methylstyrene dimer in combination with other polymerization chain transfer agents, reactivity at the polymerization can be increased.

The amount of the polymerization chain transfer agent (d) used is generally from 0.3 to 10 parts by mass, preferably from 0.5 to 7 parts by mass, per 100 parts by mass of the monomer mixture. When the amount of the polymerization chain transfer agent (d) used is not less than this lower limit, good antiblocking property is obtained, whereas when it is not more than the upper limit, good adhesion strength is obtained and this is preferred. Incidentally, the amount of the α-methylstyrene dimer used is preferably from 0.1 to 5 parts by mass per 100 parts by mass of the monomer mixture.

As for other chain transfer agents used in combination with the α-methylstyrene dimer in the polymerization chain transfer agent (d), a known polymerization chain transfer agent generally used in emulsion polymerization can be used. Specific examples thereof include mercaptans such as octylmercaptan, n-dodecylmercaptan, tert-dodecylmercaptan, n-hexadecylmercaptan, n-tetradecylmercaptan and tert-tetradecylmercaptan; xanthogen disulfides such as dimethylxanthogen disulfide, diethylxanthogen disulfide and diisopropylxanthogen disulfide; thiuram disulfides such as tetramethylthiuram disulfide, tetraethylthiuram disulfide and tetrabutylthiuram disulfide; hydrocarbon halides such as carbon tetrachloride and ethylene bromide; hydrocarbons such as pentaphenylethane; acrolein, methacrolein, allyl alcohol, 2-ethylhexyl thioglycolate, turbinolene, α-terpinene, γ-terpinene and dipentene. These polymerization chain transfer agents may be used individually or in combination of two or more thereof. Of these, mercaptans, xanthogen disulfides, thiuram disulfides and carbon tetrachloride are suitably used.

The copolymer latex for use in the present invention can be produced by a conventionally known emulsion polymerization method except that the above-described monomer mixture and polymerization chain transfer agent are used. That is, the copolymer latex can be obtained by adding the monomer mixture, a polymerization initiator, an emulsifier, the polymerization chain transfer agent and the like to an aqueous medium such as water, and performing emulsion polymerization.

(Dichloro-s-Triazine-Based Crosslinking Agent)

In the present invention, a dichloro-s-triazine-based crosslinking agent is preferably used in combination with the copolymer latex at the time of forming the ultraviolet absorbing layer on the polymer film support having an alicyclic structure. By using a dichloro-s-triazine-based crosslinking agent in combination, the adhesive force under ordinary humidity conditions, high-humidity conditions or low-humidity conditions is remarkably enhanced, and cracking does not occur under low-humidity conditions. In addition, there can be imparted an excellent effect in terms of antistatic property, scratch resistance, water resistance, solvent resistance and the like.

The dichloro-s-triazine-based crosslinking agent for use in the present invention is represented by the following formula (3) or (4).

Formula (3):

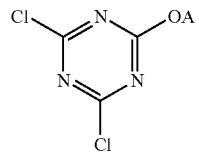

In formula (3), A is an alkyl group, a cyclic alkyl group, an aryl group, an alalkyl group, a metal or a hydrogen atom.

Formula (4):

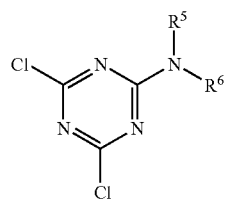

In formula (4), $R^5$ and $R^6$ each is hydrogen, an alkyl group, a cyclic alkyl group, an aryl group, an alalkyl group or $-NHR^7$ (wherein $R^7$ is an alkyl group or an acyl group), and $R^5$ and $R^6$ may combine to form a ring or may form a 5- or 6-membered ring containing O, S or $N-R^8$ ($R^8$ is an alkyl group).

The dichloro-s-triazine-based crosslinking agent can be added in an amount of 0.1 to 100 parts by mass based on the monomer mixture. When the amount of the dichloro-s-triazine-based crosslinking agent added is 0.1 parts by mass is more, the adhesive force can be satisfactorily enhanced. In addition, the effect of preventing cracking under low-humidity conditions or the effect in terms of antistatic property, scratch resistance, water resistance, solvent resistance and the like is sufficiently high and this is preferred. On the other hand, when the amount of the dichloro-s-triazine-based crosslinking agent added is 100 parts by mass or less, troubles such as remaining of unreacted crosslinking agent in a large amount or reduction in the adhesion to a hardcoat layer overlaid are advantageously not generated.

Specific examples of the dichloro-s-triazine-based crosslinking agent include those shown below.

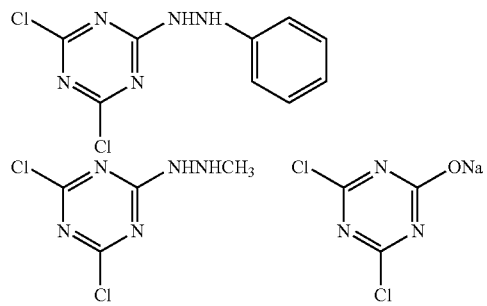

(Hydrophilic Polymer)

As for the hydrophilic polymer, synthetic or natural hydrophilic polymer compounds are used, such as gelatin, acylated gelatin (e.g., phthalated gelatin, maleated gelatin), cellulose derivatives (e.g., carboxymethyl cellulose, hydroxyethyl cellulose), grafted gelatin prepared by grafting acrylic acid, methacrylic acid, amide or the like to gelatin, polyvinyl alcohol, polyhydroxyalkyl acrylate, polyvinylpyrrolidone, polyvinylpyrrolidone-vinyl acetate copolymer, casein, agarose, albumin, sodium alginate, polysaccharide, agar, starch, graft starch, polyacrylamide, homopolymer or copolymer of N-substituted acrylamide, N-substituted methacrylamide or the like, and partial hydrolysate thereof. These polymers are used individually or as a mixture. The hydrophilic polymer is preferably gelatin or a derivative thereof.

[Formation of Ultraviolet Absorbing Layer]

The coating solution for the formation of the ultraviolet absorbing layer of the present invention can be coated by a generally well-known coating method such as dip coating method, air knife coating method, curtain coating method, roller coating method, wire bar coating method and gravure coating method, or by the extrusion coating method using a hopper described in U.S. Pat. No. 2,681,294.

The thickness of the ultraviolet absorbing layer is preferably from 50 to 2,000 nm. Within this range, both adhesive property and transparency can be satisfactorily satisfied. The thickness is more preferably from 100 to 1,500 nm, still more preferably from 200 to 1,000 nm.

In order to reduce the generation of unevenness by optical interference, a light-scattering function is preferably imparted to the inside and surface of the ultraviolet absorbing layer. For imparting a light-scattering function, the same methods as those described later for the hardcoat layer may be used.

[Layer Construction of Optical Film]

The optical film which can be formed on the film of the present invention is described below.

The optical film of the present invention can be produced by providing a single or a plurality of functional layers required according to the purpose, on a transparent substrate film (sometimes referred to as a "filmy support"). One preferred embodiment includes an antireflection film where the layers are stacked on the substrate by taking into consideration the refractive index, film thickness, number of layers, order of layers and the like so that the refractive index can be reduced by the effect of optical interference.

The simplest construction of the antireflection film is a construction where only a low refractive index layer is provided by coating on a substrate. In order to more reduce the reflectance, the antireflection layer is preferably constituted by combining a high refractive index layer having a refractive index higher than that of the substrate and a low refractive index layer having a refractive index lower than that of the substrate. Examples of the construction include a two-layer construction of high refractive index layer/low refractive index layer from the substrate side, and a construction formed by stacking three layers differing in the refractive index in the order of a middle refractive index layer (a layer having a refractive index higher than that of the substrate or hardcoat layer but lower than that of the high refractive index layer)/a high refractive index layer/a low refractive index layer. Also, a construction where a larger number of antireflection layers are stacked has been proposed.

Above all, in view of durability, optical property, cost, productivity and the like, a middle refractive index layer/a high refractive index layer/a low refractive index layer may be coated in this order on a substrate having thereon a hardcoat layer. Examples thereof include constructions described in JP-A-8-122504, JP-A-9-110401, JP-A-10-300902, JP-A-2002-243906 and JP-A-2000-111706. Other functions may also be imparted to each layer, and examples thereof include an antifouling low refractive index layer and an antistatic high refractive index layer (see, for example, JP-A-10-206603 and JP-A-2002-243906).

[Construction of Antireflection Film]

Preferred examples of the layer construction for the antireflection film of the present invention are set forth below. The antireflection film of the present invention is not limited only to these layer constructions if the reflectance can be reduced by optical interference. In the following constructions, the substrate film indicates a filmy support comprising a film.

Substrate film/ultraviolet absorbing layer/low refractive index layer

Substrate film/ultraviolet absorbing layer/antistatic layer/low refractive index layer Substrate film/ultraviolet absorbing layer/antiglare layer/low refractive index layer Substrate film/ultraviolet absorbing layer/antiglare layer/antistatic layer/low refractive index layer Substrate film/ultraviolet absorbing layer/hardcoat layer/antiglare layer/low refractive index layer Substrate film/ultraviolet absorbing layer/hardcoat layer/antiglare layer/antistatic layer/low refractive index layer Substrate film/ultraviolet absorbing layer/hardcoat layer/antistatic layer/antiglare layer/low refractive index layer Substrate film/ultraviolet absorbing layer/hardcoat layer/high refractive index layer/low refractive index layer Substrate film/ultraviolet absorbing layer/hardcoat layer/antistatic layer/high refractive index layer/low refractive index layer Substrate film/ultraviolet absorbing layer/hardcoat layer/medium refractive index layer/high refractive index layer/low refractive index layer Substrate film/ultraviolet absorbing layer/antiglare layer/high refractive index layer/low refractive index layer Substrate film/ultraviolet absorbing layer/antiglare layer/medium refractive index layer/high refractive index layer/low refractive index layer Substrate film/ultraviolet absorbing layer/antistatic layer/hardcoat layer/medium refractive index layer/high refractive index layer/low refractive index layer Antistatic layer/substrate film/ultraviolet absorbing layer/hardcoat layer/medium refractive index layer/high refractive index layer/low refractive index layer Substrate film/ultraviolet absorbing layer/antistatic layer/antiglare layer/medium refractive index layer/high refractive index layer/low refractive index layer Antistatic layer/substrate film/ultraviolet absorbing layer/antiglare layer/medium refractive index layer/high refractive index layer/low refractive index layer Antistatic layer/substrate film/ultraviolet absorbing layer/antiglare layer/high refractive index layer

[Construction of Optical Film Other Than Antireflection Film]

Another preferred embodiment is an optical film where layers necessary for imparting hardcoat property, moisture-proof property, gas-barrier property, antiglare property, antifouling property and the like are provided without aggressively using optical interference.

Preferred examples of the layer construction for the film in the above-described embodiment are set forth below. In the following constructions, the substrate film indicates a filmy support comprising a film.

Substrate film/ultraviolet absorbing layer/hardcoat layer

Substrate film/ultraviolet absorbing layer/hardcoat layer/hardcoat layer

Substrate film/ultraviolet absorbing layer/antiglare layer

Substrate film/ultraviolet absorbing layer/antiglare layer/antiglare layer

Substrate film/ultraviolet absorbing layer/hardcoat layer/antiglare layer

Substrate film/ultraviolet absorbing layer/antiglare layer/hardcoat layer

Substrate film/ultraviolet absorbing layer/antistatic layer/hardcoat layer

Substrate film/ultraviolet absorbing layer/moisture-proof layer/hardcoat layer

Substrate film/ultraviolet absorbing layer/gas-barrier layer/hardcoat layer

Substrate film/ultraviolet absorbing layer/hardcoat layer/antifouling layer

Antistatic layer/substrate film/ultraviolet absorbing layer/hardcoat layer

Antistatic layer/substrate film/ultraviolet absorbing layer/antiglare layer

These layers can be formed by vapor deposition, atmospheric plasma, coating and the like. In view of productivity, these layers are preferably formed by coating.

Each constituent layer is described below.

[Hardcoat Layer]

In the film of the present invention, a hardcoat layer is provided as an essential constituent layer on one surface of a transparent filmy support so as to impart physical strength to the film. The hardcoat layer may be composed of a stack of two or more layers.

In order to reduce unevenness by optical interference, the refractive index of the hardcoat layer for use in the present invention is preferably designed to have a small difference from the refractive index of the underlying ultraviolet absorbing layer. The refractive index of the hardcoat layer is preferably from 1.48 to 2.00, more preferably from 1.52 to 1.90, still more preferably from 1.55 to 1.80. Within this range, both antireflection performance and color tint of reflected light can be satisfied even in the embodiment having at least one low refractive index on the hardcoat layer, which is a preferred embodiment of the present invention.

From the standpoint of imparting satisfactory durability and impact resistance to the film, the thickness of the hardcoat layer is usually on the order of 0.5 to 50 μm, preferably from 1 to 20 μm, more preferably from 2 to 10 μm, and most preferably from 3 to 7 μm.

The hardness of the hardcoat layer is preferably H or more, more preferably 2H or more, and most preferably 3H or more, in the pencil hardness test.

Furthermore, in the Taber test according to JIS K-5400, the abrasion loss of the specimen between before and after test is preferably smaller.

The hardcoat layer is preferably formed trough a crosslinking or polymerization reaction of an ionizing radiation-curable compound. For example, a coating composition containing an ionizing radiation-curable polyfunctional monomer or oligomer is coated on a transparent filmy support, and a crosslinking or polymerization reaction of the polyfunctional monomer or oligomer is brought about, whereby the hardcoat layer can be formed.

The functional group in the ionizing radiation-curable polyfunctional monomer or oligomer is preferably a photo-, electron beam- or radiation-polymerizable functional group, more preferably a photopolymerizable functional group. Examples of the photopolymerizable functional group include an unsaturated polymerizable functional group such as (meth)acryloyl group, vinyl group, styryl group and allyl group. Among these, a (meth)acryloyl group is preferred.

In place of or in addition to the monomer having a polymerizable unsaturated group, a crosslinking functional group may be introduced into the binder. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal alkoxide such as tetramethoxysilane can be used as a monomer having a crosslinked structure. A functional group which exhibits the crosslinking property as a result of decomposition reaction, such as block isocyanate group, may also be used. In other words, the crosslinking functional group for use in the present invention may be a group which does not directly cause a reaction but exhibits reactivity as a result of decomposition. The binder polymer having such a crosslinking functional group is coated and then heated, whereby a crosslinked structure can be formed.

For the purpose of imparting internal scattering property, the hardcoat layer may contain a mat particle, for example, an inorganic compound particle or a resin particle, having an average particle diameter of 1.0 to 15.0 μm, preferably from 1.5 to 10.0 μm.

For the purpose of controlling the refractive index of the hardcoat layer, a high refractive index monomer, an inorganic fine particle or both may be added to the binder of the hardcoat layer. The inorganic fine particle has an effect of suppressing curing shrinkage ascribable to the crosslinking reaction of the binder, in addition to the effect of controlling the refractive index. In the present invention, a polymer which is produced by polymerization of the above-described polyfunctional monomer and/or high refractive index monomer or the like after the formation of the hardcoat layer and in which the inorganic particle is dispersed, is referred to as a binder.

From the aspect of reducing unevenness by optical interference, the hardcoat layer preferably has appropriate haze. The haze may be either surface haze or internal haze attributable to surface scattering or internal scattering, and in the film of the present invention, the surface haze and internal haze can be freely set according to the purpose.

In the case of maintaining the sharpness of image by keeping low the reflectance on the surface and not imparting a light-scattering function to the inside and surface of the hardcoat layer, the haze value is preferably lower. Specifically, the haze value is preferably 10% or less, more preferably 5% or less, and most preferably 2% or less.

On the other hand, in the case of imparting an antiglare function by the effect of surface scattering of the hardcoat layer, the surface haze is preferably from 5 to 15%, more preferably from 5 to 10%.

Also, in the case of imparting a function of making less perceivable the liquid crystal panel pattern, color unevenness, brightness unevenness or glaring by the effect of internal scattering of the hardcoat layer or a function of enlarging the viewing angle by the effect of scattering, the internal haze value (a value obtained by subtracting the surface haze value from the entire haze value) is preferably from 10 to 90%, more preferably form 15 to 80%, and most preferably from 20 to 70%.

As for the surface irregularity shape of the hardcoat layer, out of properties indicating the surface roughness, for example, the centerline average roughness (Ra) is preferably set to 0.08 μm or less so as to maintain the sharpness of image and obtain a clear surface. Ra is more preferably 0.07 μm or less, still more preferably 0.06 μm. In the film of the present invention, the surface irregularities of the film are governed by the surface irregularities of the hardcoat layer and by adjusting the centerline average roughness of the hardcoat layer, the antireflection film can be made to have a centerline average roughness within the above-described range.

For the purpose of maintaining the sharpness of image, the transmitted image clarity is preferably adjusted in addition to the adjustment of surface irregularity shape. The transmitted image clarity of a clear antireflection film is preferably 60% or more. The transmitted image clarity is generally an index showing the degree of blurring of image transmitted through and reflected on the film and as this value is larger, the image viewed through the film is clearer and better. The transmitted image clarity is preferably 70% or more, more preferably 80% or more.

(Photoradical Polymerization Initiator)

Examples of the photoradical polymerization initiator include acetophenones, benzoins, benzophenones, phosphine oxides, ketals, anthraquinones, thioxanthones, azo compounds, peroxides (see, for example, JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins. These initiators may be used individually or as a mixture.

Various examples are also described in Saishin UV *Koka Gijutsu* (*Newest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), and these are useful in the present invention.

Preferred examples of the commercially available photoradical polymerization initiator include "KAYACURE (e.g., DETX-S, BP-100, BDMK, CTX, BMS, 2-EAQ, ABQ, CPTX, EPD, ITX, QTX, BTC, MCA)" produced by Nippon Kayaku Co., Ltd.; "Irgacure (e.g., 651, 184, 500, 907, 369, 1173, 2959, 4265, 4263)" produced by Ciba Specialty Chemicals Corp.; "Esacure (KIP100F, KB1, EB3, BP, X33, KT046, KT37, KIP150, TZT)" produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

(Surface State Improver)

In the coating solution used for producing any layer on the filmy support, at least either a fluorine-based surface state improver or a silicone-based surface state improver is preferably added so as to improve the surface state failure (e.g., coating unevenness, drying unevenness, point defect).

The surface state improver preferably changes the surface tension of the coating solution by 1 mN/m or more. Here, when the surface tension of the coating solution is changed by 1 mN/m or more, this means that the surface tension of the coating solution after the addition of the surface state improver, including the concentration process at tie coating/drying, is changed by 1 mN/m or more as compared with the surface tension of the coating solution where the surface state improver is not added. A surface state improver reducing the surface tension of the coating solution by 1 mN/m or more is preferred, a surface state improver reducing the surface tension by 2 mN/m or more is more preferred, and a surface state improve reducing the surface tension by 3 mN/m or more is still more preferred.

Preferred examples of the fluorine-based surface state improve include a compound having a fluoroaliphatic group. Preferred examples of the compound include the compounds described in JP-A-2005-115359, JP-A-2005-221963 and JP-A-2005-234476.

[Antiglare Layer]

The antiglare layer is formed for the purpose of imparting an antiglare property by surface scattering. Hereinafter, the antiglare layer is sometimes referred to as a "light-scattering layer".

A hardcoat layer for enhancing the scratch resistance of film may be imparted with surface-scattering property to serve as both a hardcoat layer and an antiglare layer. Hereinafter, the layer serving as both a hardcoat layer and an antiglare layer is sometimes referred to as an "antiglare hardcoat layer". In the present invention, an "antiglare hardcoat layer" is preferred.

Known examples of the method for imparting antiglare property include a method of forming the antiglare layer by laminating a mat shaped film having fine irregularities on its surface described in JP-A-6-16851; a method of forming the antiglare layer by varying the irradiation dose of ionizing radiation and thereby bringing out curing shrinkage of an ionizing radiation-curable resin described in JP-A-2000-206317; a method of decreasing through drying the mass ratio of good solvent for light-transparent resin and thereby gelling and solidifying light-transparent fine particle and light-transparent resin to form irregularities on the film coating surface described in JP-A-2000-338310; and a method of imparting surface irregularities by applying an external pressure described in JP-A-2000-275404; and a method of forming surface irregularities by utilizing phase separation which occurs in the process of a solvent vaporizing from a mixed solution comprising a plurality of polymers described in JP-A-2005-195819. These known methods can be utilized.

(Use of Light-Transparent Particle)

In one preferred embodiment of the antiglare hardcoat layer which can be used in the present invention, a binder capable of imparting hardcoat property, a light-transparent particle for imparting antiglare property and a solvent are contained as essential components, and the irregularities on the surface are farmed by a protrusion of the light-transparent particle itself or the protrusion of an aggregate of a plurality of particles.

Specific preferred examples of the light-transparent particle include an inorganic compound particle such as silica particle and $TiO_2$ particle; and a resin particle such as acryl particle, crosslinked acryl particle, polystyrene particle, crosslinked styrene particle, melamine resin particle and benzoguanamine resin particle. Among these, a crosslinked styrene particle, a crosslinked acryl particle and a silica particle are more preferred. The shape of the mat particle may be either spherical or amorphous.

Also, two or more kinds of mat particles differing in the particle diameter may be used in combination. The mat particle having a larger particle diameter can impart antiglare property and the mat particle having a smaller particle diameter can impart another optical property. For example, when an antiglare antireflection film is laminated on a high definition display of 133 ppi or more, a trouble in view of display image grade, called "glaring", is sometimes generated. The "glaring" is ascribable to loss of brightness uniformity resulting from enlargement or shrinkage of a pixel due to irregularities present on the antiglare antireflection film surface, but this can be greatly improved by using together a mat particle having a particle diameter smaller than that of the antiglare property-imparting mat particle and having a refractive index different from that of the binder.

The mat particle is contained in the antiglare layer such that the amount of the mat particle in the formed antiglare hardcoat layer becomes preferably from 10 to 1,000 mg/m$^2$, more preferably from 100 to 700 mg/m$^2$.

The thickness of the antiglare hardcoat layer is preferably from 1 to 20 μm, more preferably from 2 to 10 μm. Within this range, the hardcoat property and properties in view of curling and brittleness can be satisfied.

The centerline average roughness (Ra) of the antiglare hardcoat layer is preferably from 0.09 to 0.40 μm. If the centerline average roughness exceeds 0.40 μm, there arises a problem such as glaring or surface whitening due to reflection of outside light. The transmitted image clarity is preferably from 5 to 60%.

The strength of the antiglare hardcoat layer is preferably H or more, more preferably 2H or more, still more preferably 3H or more, in the pencil hardness test.

(Phase Separation)

One example of the technique for imparting antiglare property, which can be used in the present invention other than the method of using a light-transparent particle to afford antiglare property, is a technique of forming irregularities on the film coating surface by utilizing spinodal decomposition of a plurality of polymers. Also, when a difference in refractive index is created among phases formed by the phase separation, good light-diffusing property can be imparted.

The light-scattering layer produced by spinodal decomposition comprises a plurality of polymers differing in the refractive index from each other, where a phase separation structure having at least a bicontinuous phase structure is usually formed in the atmosphere on use (particularly, under room temperature of approximately from bout 10 to 30° C.). The bicontinuous phase structure is formed by spinodal decomposition from a liquid phase (a liquid phase, for example, a mixed solution or a solution, at ordinary temperature) containing a plurality of polymers. This bicontinuous phase structure is usually formed by spinodal decomposition which uses a composition (for example, a mixed solution or a solution) containing a plurality of polymers and forming a liquid phase at ordinary temperature and which passes through vaporization of the solvent. Such a light-scattering layer is formed from a liquid phase and therefore, has a uniform and fine bicontinuous phase structure. When this transmitting light-scattering layer is used, substantially isotropic scattering of incident light is favored and at the same time, directivity can be imparted to the transmitted scattered light, so that both high light-scattering property and high directivity can be satisfied.

For elevating the light-scattering property, the plurality of polymers used may be combined such that the difference in the refractive index becomes, for example, approximately from 0.01 to 0.2, preferably on the order of 0.1 to 0.15. When the difference in the refractive index is 0.01 or more, the intensity of the transmitted scattered light is not reduced, whereas when the difference in the refractive index is 0.2 or less, high directivity can be imparted to the transmitted scattered light and this is preferred.

The plurality of polymers may be selected in an appropriate combination from, for example, a styrene-based polymer, a (meth)acryl-based polymer, a vinyl ester-based polymer, a vinyl ether-based polymer, a halogen-containing polymer, an olefin-based polymer (including an alicyclic olefin-based polymer), a polycarbonate-based resin, a polyester-based resin, a polyamide-based resin, a thermoplastic polyurethane resin, a polysulfone-based resin (e.g., polyethersulfone, polysulfone), a polyphenylene ether-based resin (e.g., polymer of 2,6-xylenol), a cellulose derivative (e.g., cellulose esters, cellulose carbamates, cellulose esters), a silicone resin (e.g., polydimethylsiloxane, polymethylphenylsiloxane), and a rubber or elastomer (for example, a diene-based rubber such as polybutadiene and polyisoprene, a styrene-butadiene copolymer, an acrylonitrile-butadiene copolymer, acrylic rubber, urethane rubber and silicone rubber).

Preferred examples of the polymer include a styrene-based polymer, a (meth)acryl-based polymer, a vinyl ester-based polymer, a vinyl ether-based polymer, a halogen-containing polymer, an alicyclic olefin-based polymer, a polycarbonate-based resin, a polyester-based resin, a polyamide-based resin, a cellulose derivative, a silicone-based resin, and a rubber or elastomer. As for the plurality of polymers, non-crystalline polymers soluble in an organic solvent (particularly a common solvent capable of dissolving the plurality of polymers) are usually used. In particular, polymers having high shapability or film-formability, high transparency or high weather resistance, such as styrene-based polymer, (meth)acryl-based polymer, alicyclic olefin-based polymer, polyester-based resin and cellulose derivative (e.g., cellulose esters), are preferred.

A plurality of these polymers can be used in appropriate combination. In the combination of a plurality of polymers, for example, a cellulose derivative, particularly cellulose esters (for example, cellulose $C_{2-4}$ alkylcarboxylic acid esters such as cellulose diacetate, cellulose triacetate, cellulose acetate propionate and cellulose acetate butyrate), may be used as at least one polymer and combined with other polymers.

The glass transition temperature of the polymer may be selected in the range, for example, from −100° C. to 250° C., preferably from −50 to 230° C., more preferably on the order of 0 to 200° C. (for example, approximately from 50 to 180° C.). In view of strength and rigidity of the film, it is advantageous that the glass transition temperature of at least one polymer out of the constituent polymers is 50° C. or more (for example, approximately from 70 to 200° C.), preferably 100° C. or more (for example, approximately from 100 to 170° C.).

The weight average molecular weight of the polymer is selected in the range, for example, of 1,000,000 or less (approximately from 10,000 to 1,000,000), preferably on the order of 10,000 to 700,000.

A wet process of effecting the spinodal decomposition by vaporizing the solvent from a liquid phase containing a plurality of polymers is preferably employed. In principle, a light-scattering layer having a substantially isotropic bicontinuous phase structure can be formed irrespective of the compatibility of the plurality of polymers. Therefore, although a construction where a plurality of polymers compatible with each other are combined may be employed, in order to easily control the phase separation structure by spinodal decomposition and form a bicontinuous phase structure with good efficiency, a plurality of incompatible (phase-separable) polymers are usually combined in many cases.

The plurality of polymers may be composed of a combination of a first polymer and a second polymer, and the first and second polymers each may be composed of a single resin or a plurality of resins. The combination of the first polymer and the second polymer is not particularly limited. For example, when the acetate propionate), the second polymer may be a styrene-based resin (e.g., polystyrene, styrene-acrylonitrile copolymer), a (meth)acryl-based resin (e.g., polymethyl methacrylate), an alicyclic olefin-based resin (e.g., polymer using norbornene as a monomer), a polycarbonate-based resin, a polyester-based resin (e.g., poly-$C_{2-4}$-alkylene acrylate-based copolyester) or the like.

The ratio of the first polymer to the second polymer is, for example, the former/the latter=on the order of 10/90 to 90/10 (by mass), preferably on the order of 20/80 to 80/20 (by mass), more preferably on the order of 30/70 to 70/30 (by mass), still more preferably on the order of 40/60 to 60140 (by mass). When the ratio between two polymers are in the range above, a problem such as disproportionated volume ratio among separated phases and resultant reduction in the intensity of scattered light is not caused and this is preferred. Incidentally, in the case of forming a hardcoat layer from three or more kinds of polymers, the content of each polymer is usually selected in the range approximately from 1 to 90 mass % (for example, from 1 to 70 mass %, preferably from 5 to 70 mass %, more preferably from 10 to 70 mass %).

The bicontinuous phase structure is sometimes called a bicontinuous structure or a three-dimensionally continuing or connecting structure and means a structure where at least two kinds of constituent polymer phases are continuing (for example, network structure). This type of light-scattering layer is sufficient if it has a bicontinuous phase structure, and may have a structure where a bicontinuous phase structure and a droplet phase structure (independent or isolated phase structure) are intermingled.

In the spinodal decomposition, with the progress of phase separation, the polymers form a bicontinuous phase structure and on further progress of the phase separation, the continuous phase becomes discontinuous due to its own surface tension and assumes a liquid droplet structure (an island-in-sea structure of independent phases in the spherical or really spherical form or the like). Therefore, according to the degree of phase separation, an intermediate structure between a bicontinuous phase and a droplet phase structure, that is, a phase structure in the transition process from the bicontinuous phase to the droplet phase, can be formed. In the context of the present invention, this intermediate structure is also referred to as a bicontinuous phase structure. In the case where the phase separation structure is a mixed structure of bicontinuous phase structure and droplet structure, the proportion of the droplet phase (independent polymer phase) may be, for example, 30% or less (by volume), preferably 10% or less (by volume). The configuwation of the bicontinuous phase structure is not particularly limited and may be a network configuration, particularly a random network configuration.

The bicontinuous phase structure is substantially isotropic, and the anisotropy is usually reduced in the layer or optical film plane. The term "isotropy" means that the average interphase distance of the bicontinuous phase structure is substantially equal in all directions in the optical film plane.

The bicontinuous phase structure usually has a regularity in the interphase distance (the distance between identical phases). Because of this, the light incident on the optical film gives transmitted scattered light directed in a specific direction due to Bragg reflection. Therefore, even when the optical film is loaded in a reflection-type liquid crystal display device, the transmitted scattered light can be directed in a fixed direction, so that the display screen can be made remarkably bright and the problem unsolvable by conventional particle dispersion-type transmitting light-scattering sheets, that is, the reflection of light source (e.g., fluorescent tube) on the panel, can be avoided.

In the optical film, the average interphase distance of the bicontinuous phase is, for example, on the order of 0.5 to 20 µm (for example, from 1 to 20 µm), preferably on the order of 1 to 15 µm (for example, from 1 to 10 µm). If the average interphase distance is too small, high intensity of scattered light can be hardly obtained, whereas if the average interphase distance is excessively large, the directivity of transmitted scattered light decreases.

Incidentally, the average interphase distance of the bicontinuous layer can be calculated from a micrograph of the light-scattering layer or optical film (through a transmission microscope, a phase-contrast microscope, a confocal laser microscope or the like). Also, after measuring the scattering angle θ giving a maximal intensity of scattered light by the same method as that for evaluating the directivity of scattered light which is described later, the average interphase distance d of the bicontinuous phase may be calculated according to the following formula of Bragg reflection condition.

$$2d \cdot \sin(\theta/2) = \lambda \qquad \text{Mathematical Formula 1}$$

(wherein d represents the average interphase distance of the bicontinuous phase, θ represents the scattering angle, and λ represents the wavelength of light).

(Emboss)

One example of the technique for producing the light-scattering layer, other than the method of using a light-transparent particle to afford antiglare property, is a technique of producing the light-scattering layer by an emboss method. The light-scattering layer produced by an emboss method is a light scattering layer substantially comprising an ionizing radiation-curable resin composition or a thermosetting resin composition, which is formed on a transparent substrate and shared with a matted excipient film having fine irregularities on the surface.

As for the production method, in the case where the resin is an ionizing radiation-curable resin composition, the above-described light-scattering layer is preferably produced by a production method where an ionizing radiation-curable resin composition is coated on a transparent substrate, a matted excipient film having fine irregularities on the surface is laminated on the uncured film coating of the coated ionizing radiation-curable resin composition, ionizing radiation is then irradiated on the film coating laminated with the excipient film to cure the film coating of the ionizing radiation-curable resin composition, and the excipient film is separated from the cured film coating of the ionizing radiation-curable resin.

In the case where the resin is a thermosetting resin composition, the light-scattering layer is preferably produced by a production method where a thermosetting resin composition is coated on a transparent substrate, a matted excipient film having fine irregularities on the surface is laminated on the uncured film coating of the coated thermosetting resin composition, the film coating laminated with the excipient film is cured by heating, and the excipient film is separated from the cured film coating of the thermosetting resin composition.

At the time of laminating the excipient film on the uncured film coating of the ionizing radiation-curable resin composition, when the resin coated is a solvent dilution type, the lamination is performed after drying the solvent, and when the resin coated is a solventless type, the excipient film is directly laminated.

As regards the film-forming components of the ionizing radiation-curable resin composition for use in the light-scattering layer by an embossing method, there way be preferably used those having an acrylate-based functional group, for example, an oligomer or prepolymer of (meth)acrylate or the like of a polyfunctional compound such as relatively low-molecular weight polyester resin, polyether resin, acryl polymer, epoxy resin, urethane resin, alkyd resin, spiroacetal resin, polybutadiene polymer, polythiol-polyene resin and polyhydric alcohol; and those containing a relatively large amount of a reactive diluent, for example, a monofunctional monomer such as ethyl(meth)acrylate, ethylhexyl(meth) acrylate, styrene, methylstyrene and N-vinylpyrrolidone, and a polyfunctional monomer such as trimethylolpropane tri (meth)acrylate, hexanediol(meth)acrylate, tripropylene glycol di(meth)acrylate, diethylene glycol di(meth)acrylate, pentacrythritol tri(meth)acrylate, dipentaerythritol hexa(meth)acrylate, 1,6-hexanediol di(meth)acrylate and neopentyl glycol di(meth)acrylate.

In particular, a mixture of polyester acrylate and polyurethane acrylate is preferred. Because, the polyester acrylate gives a very hard film coating and is suitable for obtaining hardcoat property, but the film coating of polyester acrylate alone is low in the impact resistance and is brittle and for imparting impact resistance and flexibility to the film coating, polyurethane acrylate is used in combination. The ratio of the polyurethane acrylate to 100 parts by mass of polyester acrylate is preferably 30 parts by mass or less. When the ratio is not more than this value, a problem such that the film coating is too soft and loses the hard property does not arise and this is preferred.

Furthermore, the ionizing radiation-curable resin composition above can be used as an ultraviolet-curable resin composition by mixing therein a photoradical polymerization initiator such as acetophenones, benzophenones, Michler's benzoyl benzoate, α-amyloxime ester, tetramethylthiuram monosulfide or thioxanthones, and a photosensitizer such as n-butylamine, triethylamine or tri-n-butylphosphine. Above all, in the present invention, it is preferred to mix, as the oligomer, urethane acrylate and, as the monomer, dipentaerythritol hexa(meth)acrylate or the like.

[High Refractive Index Layer, Medium Refractive Index Layer]

In the film of the present invention, when a high refractive index layer and a medium refractive index layer are provided to utilize optical interference together with a low refractive index layer described later, the antireflection property can be enhanced.

In the following context of the present invention, these high refractive index layer and medium refractive index layer are sometimes collectively referred to as a high refractive index layer. Incidentally, in the present invention, the terms "high", "medium" and "low" in the high refractive index layer, medium refractive index layer and low refractive index indicate the relative size of refractive index among layers. In terms of relationship with the transparent support (filmy support), the refractive index preferably satisfies the relationships of transparent support>low refractive index layer, and high refractive index layer>transparent support.

Also, in the present invention, the high refractive layer, medium refractive layer and low refractive index layer are sometimes collectively referred to as an antireflection layer.

For producing an antireflection film by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

In the case of producing an antireflection film by providing a medium refractive index layer, a high refractive index layer and a low refractive index layer in the order closer to the filmy support side, the refractive index of the high refractive index layer is preferably from 1.65 to 2.40, more preferably from 1.70 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80.

Specific examples of the inorganic particle for use in the high refractive index layer and medium refractive index layer include $TiO_2$, $ZrO_2$, $Al_2O_3$, $In_2O_3$, ZnO, $SnO_2$, $Sb_2O_3$, indium tin oxide (ITO) and $SiO_2$. $TiO_2$ and $ZrO_2$ are preferred in view of increasing the refractive index. It is also preferred to subject the surface of the inorganic filter to silane coupling treatment or titanium coupling treatment.

The content of the inorganic particle in the high refractive index layer is preferably from 10 to 90 mass %, more preferably front 15 to 80 mass %, still more preferably from 15 to 75 mass %, based on the mass of the high refractive index layer. Two or more kinds of inorganic particles may be used in combination in the high refractive index layer.

In the case of having a low refractive index layer on the high refractive index layer, the refractive index of the high refractive index layer is preferably higher than the refractive index of the transparent filmy support.

In the high refractive index layer, a binder obtained by a crosslinking or polymerization reaction of an aromatic ring-containing ionizing radiation-curable compound, an ionizing radiation-curable compound containing a halogen element (e.g., Br, I, Cl) except for fluorine, an ionizing radiation-curable compound containing an atom such as S, N and P, or the like may also be preferably used.

The film thickness of the high refractive index layer may be appropriately designed according to the usage. In the case of using the high refractive index layer as an optical interference layer described later, the film thickness is preferably from 30 to 200 nm, more preferably from 50 to 170 nm, still more preferably from 60 to 150 nm.

In the case of not containing a particle imparting an antiglare function, the haze of the high refractive index layer is preferably lower. The haze is preferably 5% or less, more preferably 3% or less, still more preferably 1% or less. The high refractive index layer is preferably formed on the transparent filmy support directly or through another layer.

[Low Refractive Index Layer]

A low refractive index layer is preferably used for reducing the reflectance of the optical film of the present invention.

The refractive index of the low refractive index layer is preferably from 1.20 to 1.46, more preferably from 1.25 to 1.46, still more preferably from 1.30 to 1.40.

The thickness of the low refractive index layer is preferably from 50 to 200 nm, more preferably from 70 to 100 nm.

The haze of the low refractive index layer is preferably 3% or less, more preferably 2% or less, and most preferably 1% or less.

The strength of the low refractive index layer is specifically, in the pencil hardness test with a load of 500 g, preferably H or more, more preferably 2H or more, and most preferably 3H or more.

Also, in order to improve the antifouling performance of the optical film, the contact angle for water on the surface is preferably 90° or more, more preferably 95° or more, still more preferably 100° or more.

The preferred embodiment of the curable composition for forming the low refractive index layer includes, for example, (1) a composition containing a fluorine-containing polymer having a crosslinking or polymerizable functional group, (2) a organosilane material, and (3) a composition containing a monomer having two or more ethylenically unsaturated groups and an inorganic fine particle having a hollow structure.

(1) Fluorine-Containing Compound Having Crosslinking or Polymerizable Functional Group The fluorine-containing polymer having a crosslinking or polymerizable functional group includes a copolymer of a fluorine-containing monomer with a monomer having a crosslinking or polymerizable functional group. Examples of the fluorine-containing monomer include fluoroolefins (e.g., fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid [e.g., "Viscoat 6FM" (produced by Osaka Organic Chemical Industry Ltd.}, "M-2020" {produced by Daikin Industries, Ltd.}], and completely or partially fluorinated vinyl ethers.

One embodiment of the monomer for imparting a crosslinking group is a (meth)acrylate monomer previously having a crosslinking functional group in the molecule, such as glycidyl methacrylate. Another embodiment is a method where a fluorine-containing copolymer is synthesized using a monomer having a functional group such as hydroxyl group and thereafter, a monomer for modifying the substituent to introduce a crosslinking or polymerizable functional group is further used. Examples of the monomer include a (meth)acrylate monomer having a carboxyl group, a hydroxyl group, an amino group, a sulfonic acid group or the like {for example, (meth)acrylic acid, methylol(meth)acrylate, hydroxylalkyl(meth)acrylate and allyl acrylate}. The latter embodiment is disclosed in JP-A-10-23388 and JP-A-10-147739.

The fluorine-containing copolymer may contain appropriate copolymerizable components in view of solubility, dispersibility, coat ability, antifouling property and antistatic property. Particularly, for imparting antifouling property•slipperiness, silicone is preferably introduced and this may be introduced into the main chain and into the side chain.

Examples of the method for introducing a polysiloxane partial structure into the main chain include a method using a polymer-type initiator such as azo group-containing polysiloxane amide {as the commercial product, "VPS-0501 and VPS-1001" (trade names), produced by Wako Pure Chemicals Industries, Ltd.} described in JP-A-6-93100. Examples of the method for the introduction into the side chain include a method of introducing a polysiloxane having a reactive group at one terminal [for example, "Silaplane" series {produced by Chisso Corp.}] by a polymer reaction described in J. Appl. Polym. Sci., Vol. 2000, page 78 (1955) and JP-A-56-28219; and a method of polymerizing a polysiloxane-containing silicon macromer. Both methods may be preferably used.

With the fluorine-containing copolymer, as described in JP-A-2000-17028, a curing agent having a polymerizable unsaturated group may be appropriately used in combination. Also, as described in JP-A-2002-145952, combination use with a compound having a fluorine-containing polyfunctional polymerizable unsaturated group is preferred. Examples of the compound having a polyfunctional polymerizable unsaturated group include the above-described monomer having two or more ethylenically unsaturated groups. A hydrolysis condensate of organosilane described in JP-A-2004-170901 is also preferred, and a hydrolysis condensate of organosilane containing a (meth)acryloyl group is more preferred. These compounds are preferred particularly when a compound having a polymerizable unsaturated group is used for the polymer body, because the combination use is greatly effective for the improvement of scratch resistance.

In the case where the fluorine-containing copolymer itself does not have sufficiently high curability by itself, necessary curability can be imparted by blending a crosslinking compound. For example, when the polymer body contains a hydroxyl group, various amino compounds are preferably used as the curing agent. The amino group used as the crosslinking group is a compound containing two or more in total of either one or both of a hydroxylalkylamino group and an alkoxyalkylamino group, and specific examples thereof include a melamine-based compound, a urea-based compound, a benzoguanamine-based compound and a glycoluril-based compound. For the curing of such a compound, an organic acid or a salt thereof is preferably used.

Specific examples of the fluorine-containing copolymer described above are described in JP-A-2003-222702 and JP-A-2003-183322.

(2) Hydrolysis Condensate of Fluorine-Containing Organosilane Material

The composition mainly comprising a hydrolysis condensate of a fluorine-containing organosilane compound is also preferred because of low refractive index and high hardness of the film coating surface. A condensate of a compound containing a hydrolyzable silanol at one terminal or both terminals with respect to the fluorinated alkyl group and a tetraalkoxysilane is preferred. Specific examples of the composition are described in JP-A-2002-265866 and Japanese Patent 317,152.

(3) Composition Containing Monomer Having Two or More Ethylenically Unsaturated Groups and Inorganic Fine Particle Having Hollow Structure A still another preferred embodiment is a low refractive index layer comprising a low refractive index particle and a binder. The low refractive index particle may be either organic or inorganic, but a particle having a cavity in the inside thereof is preferred. Specific examples of the hollow particle include a silica-based particle described in JP-A-2002-79616. The refractive index of the particle is preferably from 1.15 to 1.40, more preferably from 1.20 to 1.30. The binder includes the monomer having two or more ethylenically unsaturated groups described above in the paragraph of Antiglare Layer.

In the low refractive index layer for use in the present invention, a polymerization initiator described above in the paragraph of Antiglare Layer is preferably added. In the case of containing a radical polymerizable compound, the polymerization initiator can be used in an amount of 1 to 10 parts by mass, preferably from 1 to 5 parts by mass, based on the compound.

In the low refractive index layer for use in the present invention, an inorganic particle can be used in combination. In order to impart scratch resistance, it is preferred to use a fine particle having a particle diameter corresponding to from 15 to 150%, preferably from 30 to 100%, more preferably from 45 to 60%, of the thickness of the low refractive index layer.

In the low refractive index layer, a known polysiloxane-based or fluorine-based antifouling agent, slipping agent or the like may be appropriately added for the purpose of imparting properties such as antifouling property, water resistance, chemical resistance and slipperiness.

[Antistatic Layer]

In the present invention, an antistatic layer is preferably provided from the standpoint of preventing electrostatic charge on the film surface. Examples of the method for forming the antistatic layer include conventionally known methods such as a method of coating an electrically conductive coating solution containing an electrically conductive fine particle and a reactive curable resin, and a method of vapor-depositing or sputtering a transparent film-forming metal or metal oxide or the like to form an electrically conductive thin film. The antistatic layer may be formed on the support directly or through a primer layer ensuring firm adhesion to the support. Also, the antistatic layer may be used as a part of the antireflection layer. In this case, when the antistatic layer is used as a layer closer to the outermost surface layer, sufficiently high antistatic property can be obtained even if the layer thickness is small.

Furthermore, when the ultraviolet absorbing layer contains an electrically conductive metal oxide, the layer can serve as both an ultraviolet absorbing layer and an antistatic layer.

The thickness of the antistatic layer is preferably from 0.01 to 10 μm, more preferably from 0.03 to 7 μm, still more preferably from 0.05 to 5 μm.

The surface resistance of the antistatic layer is preferably from $10^5$ to $10^{12}$ Ω/sq, more preferably from $10^5$ to $10^9$ Ω/sq, and most preferably from $10^5$ to $10^8$ Ω/sq. The surface resistance of the antistatic layer may be measured by a four-probe method.

It is preferred that the antistatic layer is substantially transparent. To speak specifically, the haze of the antistatic layer is preferably 10% or less, more preferably 5% or less, still more preferably 3% or less, and most preferably 1% or less. The transmittance for light at a wavelength of 550 nm is preferably 50% or more, more preferably 60% or more, still more preferably 65% or more, and most preferably 70% or more.

The antistatic layer for use in the present invention has excellent hardness. More specifically, the hardness of the antistatic layer is, in terms of the pencil hardness with a load of 1 kg, preferably H or more, more preferably 2H or more, still more preferably 3H or more, and most preferably 4H or more.

[Coating Solvent]

Out of these constituent layers, the layer coated in adjacency to the substrate film (filmy support) preferably contains at least one or more kinds of a solvent capable of dissolving the substrate film and at least one or more kinds of a solvent incapable of dissolving the substrate film. By virtue of such an embodiment, excessive penetration of the adjacent layer component into the substrate film can be prevented and at the same time, the adhesion between the adjacent layer and the substrate film can be ensured. Furthermore, at least one species out of the solvents capable of dissolving the substrate film preferably has a boiling point higher than the boiling point of at least one species out of the solvents incapable of dissolving the substrate film. More preferably, the difference in the boiling point between a solvent having a highest boiling point out of the solvents capable of dissolving the substrate film and a solvent having a highest boiling point out of the solvents incapable of dissolving the substrate is 30° C. or more, and most preferably 40° C. or more.

The mass ratio (A/B) between the total amount (A) of the solvents capable of dissolving the transparent substrate film and the total amount (B) of the solvents incapable of dissolving the transparent substrate film is preferably from 5/95 to 50/50, more preferably from 10/90 to 40/60, still more preferably from 15/85 to 30/70.

<Usage of Optical Film>

[Polarizing Plate]

The optical film of the present invention is laminated as a protective film to at least one surface of a polarizer, whereby a polarizing plate is fabricated. As for the protective film on the other surface of the polarizer, a film having a moisture permeability of 700 to 3,000 g/m$^2$·day, more preferably from 1,000 to 1,700 g/m$^2$·day is preferably laminated. Usually, a general-purpose cellulose acetate film such as triacetyl cellulose (TAC) is suitably used.

On the other surface of the polarizer, a normal cellulose acetate film may be used, but a cellulose acetate produced by a solution film-forming method and stretched at a draw ratio of 10 to 100% in the width direction in the case of a rolled film form can be also used.

Furthermore, in the polarizing plate of the present invention, the protective film on one surface is the optical film of the present invention, while the protective film on the other surface may be an optically compensatory film (phase difference film) having an optically anisotropic layer comprising a liquid crystalline compound. The optically compensatory film can improve the viewing angle properties of a liquid crystal display screen. As for the optically compensatory film, those heretofore known may be used, but in view of enlarging the viewing angle, the optically compensatory film described in JP-A-2001-100042 is preferred.

Also, in the polarizing plate of the present invention, the protective film on one surface is the optical film of the present invention, while the protective film on the other surface may be a film having Re of 0 to 10 nm and Rth of −20 to 20 nm (see, for example, JP-A-2005-301227, paragraph [00951]).

Examples of the polarizer include an iodine-based polarizer, a dye-based polarizer using a dichroic dye, and a polyene-based polarizer. The iodine-based polarizer and dye-based polarizer are generally produced using a polyvinyl alcohol-based film.

The optical film of the present invention when used with a liquid crystal display device or the like is preferably disposed on the viewing side opposite the liquid crystal cell.

[Liquid Crystal Display Device]

The optical film and polarizing plate of the present invention can be advantageously used for an image display device such as liquid crystal display device, and is preferably used as an outermost surface layer of the display.

The liquid crystal display device comprises a liquid crystal cell and two polarizing plates disposed on both sides thereof, and the liquid crystal cell carries a liquid crystal between two electrode substrates. Furthermore, one sheet of optically anisotropic layer may be disposed between the liquid crystal cell and one polarizing plate, or two sheets of optically anisotropic layer may be disposed, that is, one between the liquid crystal cell and one polarizing plate and another between the liquid crystal cell and another polarizing plate.

[Mode of Liquid Crystal Cell]

The liquid crystal cell is preferably a TN-mode, VA-mode, OCB-mode, IPS-mode or ECB-mode liquid crystal cell.

(TN Mode)

In the TN-mode liquid crystal cell, rod-like liquid crystalline molecules are oriented substantially in the horizontal alignment at the time of not applying a voltage and furthermore, twisted at an angle of 60 to 120°. The TN-mode liquid crystal cell is most frequently utilized as a color TFT liquid crystal display device and described in a large number of publications.

(VA Mode)

In the VA-mode liquid crystal cell, rod-like liquid crystalline molecules are oriented substantially in the vertical alignment at the time of not applying a voltage.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) an (MVA-mode) liquid crystal cell where the VA mode is modified to a multi-domain system for enlarging the viewing angle (described in *SID97, Digest of Tech. Papers* (preprints), 28, 845 (1997)); (3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

(OCB Mode)

The OCB-mode liquid crystal cell is a liquid crystal cell of bend orientation mode where rod-like liquid crystalline molecules are oriented substantially in the reverse direction (symmetrically) between upper portion and lower portion of the liquid crystal cell, and this is described in U.S. Pat. Nos. 4,583,825 and 5,410,422. Since rod-like liquid crystalline molecules are symmetrically oriented between upper portion and lower portion of the liquid crystal cell, the liquid crystal cell of bend orientation mode has a self-optically compensating ability. Accordingly, this liquid crystal mode is called an OCB (optically compensatory bend) liquid crystal mode. A liquid crystal display device of bend orientation mode is advantageous in that the response speed is fast.

(IPS Mode)

The IPS-mode liquid crystal cell employs a system of switching the nematic liquid crystal by applying a transverse electric field thereto, and this is described in detail in *Proc. IDRC* (*Asia Display* '95)) pp. 577-580 and ibid., pp. 707-710.

(ECB Mode)

In the ECB-mode liquid crystal cell, rod-like liquid crystalline molecules are oriented substantially in the horizontal alignment at the time of not applying a voltage. The ECB mode is one of liquid crystal display modes having a simplest structure and is described in detail, for example, in JP-A-5-203946.

[Brightness Enhancing Film]

As for the brightness enhancing film, a polarization conversion element having a function of separating the light emitted from a light source (backlight) into transmitted polarized light and reflected or scattered polarized light is used. Such a brightness enhancing film can enhance the output efficiency of linearly polarized light by utilizing the reflexive light from the backlight of reflected or scattered polarized light.

Examples thereof include an anisotropic reflection polarizer. An example of the anisotropic reflection polarizer is an anisotropic multilayer thin film which transmits linearly polarized light in one vibration direction and reflects linearly polarized light in another vibration direction.

Examples of the anisotropic multilayer thin film include "DBEF" produced by 3M Company (see, for example, JP-A-4-268505). Furthermore, the anisotropic reflection polarizer includes a composite of a cholesteric liquid crystal layer and a λ/4 plate. An example of such a composite is "PCF" produced by Nitto Denko Corp. (see, for example, JP-A-11-231130). The anisotropic reflection polarizer also includes a reflective grid polarizer. The reflective grid polarizer includes a reflective metal grid polarizer made to output reflected polarized light even in the visible light region by microfabricating a metal (see, for example, U.S. Pat. No. 6,288,840), and a polarizer obtained by incorporating a metal fine particle into a polymer matrix and stretching the film formed therefrom (see, for example, JP-A-8-184701).

The brightness enhancing film also includes an anisotropic scattering polarizer. An example of the anisotropic scattering polarizer is DRP produced by 3M Company (see, U.S. Pat. No. 5,825,543).

The brightness enhancing film further includes a polarizing element which can convert polarized light in a single pass.

Examples thereof include those using Smectic C* (see, for example, JP-A-2001-201635). In addition, an anisotropic diffraction grating can be used.

In the case of a liquid crystal display device using a brightness enhancing film, it is preferred that the polarizing plate using the optical film of the present invention as a protective film is used only for the polarizing plate on the viewing side and a polarizing plate using a film with Re and Rth both being 300 nm or less is used for the film in contact with the brightness enhancing film on the backlight side. By this arrangement, birefringent interference is suppressed, and the rainbow unevenness and color change are greatly improved.

Furthermore, it is more preferred to use a film having Re of 0 to 10 nm and Rth of −30 to 25 nm. Preferred examples thereof include "TAC" {produced by FUJIFILM Corporation}, and more preferred examples include "Z-TAC" {produced by FUJIFILM Corporation}, "O-PET" {produced by Kanebo Ltd.) and "Altesta Film" {produced by Mitsubishi Gas Chemical Industries Ltd.}.

In the case of using a brightness enhancing film, it is preferred for preventing intrusion of moisture into the polarizing plate and suppressing the light leakage that the polarizing plate and the brightness enhancing film are in tight contact. The adhesive for laminating the polarizing plate and the brightness enhancing film is not particularly limited. For example, an adhesive using, as the base polymer, an acryl-based polymer, a silicone-based polymer, a polyester, a polyurethane, a polyamide, a polyvinyl ether, a vinyl acetate/vinyl chloride copolymer, a modified polyolefin, or an epoxy-based, fluorine-based or rubber-based (e.g., natural rubber, synthetic rubber) polymer may be appropriately selected and used. In particular, an adhesive having high optical transparency, exhibiting appropriate wettability and adhesive properties of cohesion and adhesion, and being excellent in weather resistance, heat resistance and the like can be preferably used.

[Touch Panel]

The optical film of the present invention can be applied to a touch panel and the like described, for example, in JP-A-5-127822 and JP-A-2002-48913.

[Organic EL Device]

The optical film of the present invention can be used as a substrate (substrate film) or protective film of an organic EL device or the like.

In the case of using the optical film of the present invention for an organic EL device or the like, the contents described, for example, in JP-A-11-335661, JP-A-11-335368, JP-A-2001-192651, JP-A-2001-192652, JP-A-2001-192653, JP-A-2001-335776, JP-A-2001-247359, JP-A-2001-181616, JP-A-2001-181617, JP-A-2002-181816, JP-A-2002-181617 and JP-A-2002-056976 may be applied. Furthermore, the contents described in JP-A-2001-148291, JP-A-2001-221916 and JP-A-2001-231443 are preferably used in combination.

EXAMPLES

The present invention is described below by referring to Examples, but the present invention is not limited thereto. Incidentally, unless otherwise indicated, the "parts" and "%" are on the mass basis.

<Production of Optical Film>

Synthesis Example 1

Synthesis of Perfluoroolefin Copolymer (1)

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide are charged, and the inside of the system is degassed and displaced with nitrogen gas. Furthermore, 25 g of hexafluoropropylene (HFP) is introduced into the autoclave, and the temperature is elevated to 65° C. The pressure when the temperature in the autoclave reaches 65° C. is 0.53 MPa. The reaction is continued for 8 hours while keeping this temperature and when the pressure reaches 0.31 MPa, the heating is stopped and the system is allowed to cool. At the time when the inner temperature drops to room temperature, the unreacted monomer is expelled and the autoclave is opened to take out the reaction solution. The obtained reaction solution is poured in a large excess of hexane and after removing the solvent by decantation, the precipitated polymer is taken out. This polymer is dissolved in a small amount of ethyl acetate, and the residual monomer is completely removed by performing reprecipitation twice from hexane. After drying, 28 g of a polymer is obtained. Subsequently, 20 g of this polymer is dissolved in 100 ml of N,N-dimethylacetamide, and 11.4 g of acrylic acid chloride is added dropwise thereto under ice cooling, followed by stirring at room temperature for 10 hours. Thereafter, ethyl acetate is added to the reaction solution, and the resulting solution is washed with water. The organic layer is extracted and then concentrated, and the obtained polymer is reprecipitated from hexane to obtain 19 g of Perfluoroolefin Copolymer (1) shown below. The refractive index of the obtained polymer is 1.421.

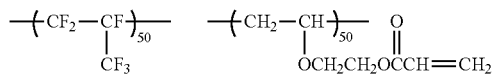

Perfluoroolefin Copolymer (1):

(50:50 indicates a molar ratio)

(50:50 indicates a molar ratio)

Synthesis Example 2

Synthesis of Ultraviolet-Absorbing Polymer Particle (J)

600 Parts of water is filled in a reaction vessel equipped with a stirrer and a reflux condenser, and 0.7 parts of polyvinyl alcohol and 2.7 parts of sodium dodecylbenzenesulfonate are added thereto and dissolved. Subsequently, a mixed solution containing 60.0 parts of an ultraviolet absorbing monomer 2-[2'-hydroxy-5'-(methacryloyloxy)ethylphenyl]-2H-benzotriazole {"RUVA-93", trade name, produced by Otsuka Chemical Co., Ltd.}, 39.0 parts of methyl methacrylate, 1.0 part of ethylene glycol dimethacrylate and 2.0 parts of benzoyl peroxide is added thereto and stirred. This mixed solution is dispersed using a homogenizer at 9,000 rpm for 15 minutes and made uniform. The stirring is continued at 75° C. for 4 hours while blowing nitrogen gas. Thereafter, the product is lightly dehydrated by centrifugal separation, then washed with water and dried to produce Polymer Particle (J).

[Preparation of Coating Solution for Ultraviolet Absorbing Layer]

Formulation Example 1-1

Preparation of Coating Solution (UV-A) for Ultraviolet Absorbing Layer 5.2 parts of sodium polyacrylate {"Poiz-530" (trade name), produced by Kao Corp.} as a dispersant, 10.5 parts of glycerin as an aggregation inhibitor and 49.3 parts of water are mixed with 5 parts of spindle-shaped fine particulate titanium oxide (TI-A) {average primary particle diameter of short axis diameter: 8 nm (short axis diameter at both ends of particle: 5 nm) and long axis diameter: 32 nm, aspect ratio: 4, rutile crystallinity: 55%}, and the mixture is dispersed in "Dissolver" {manufactured by Tokushu Kika Kogyo Co., Ltd.} at 3,000 rpm for 30 minutes and then passed 5 times through a horizontal sand grinder at 2,500 rpm to obtain Dispersion (UV1).

Gelatin is mixed with Dispersion (UV1) such that the ratio of spindle-shaped fine particulate titanium oxide (TI-A)/gelatin in the coating solution (UV1) becomes 2/1. In this way, Coating Solution (UV-A) for Ultraviolet Absorbing Layer is prepared.

Formulation Example 1-2

Preparation of Coating Solution (UV-B) for Ultraviolet Absorbing Layer

Dispersion (UV2) is obtained in the same manner as in Formulation Example 1-1 except for using fine particulate titanium oxide "TI-B" {spherical, average primary particle diameter: 12 nm, rutile crystallinity: 35%, surface-treated with aluminum oxide in 10% (based on titanium oxide)} in place of using fine particulate titanium oxide (TI-A) in Formulation Example 1-1.

Gelatin is mixed with Dispersion (UV2) such that the ratio of fine particulate titanium oxide "TI-A"/gelatin in the coating solution (UV2) becomes 2/1. In this way, Coating Solution (UV-B) for Ultraviolet Absorbing Layer is prepared.

Formulation Example 1-3

Preparation of Coating Solution (UV-C) for Ultraviolet Absorbing Layer

Coating Solution (UV-C) for Ultraviolet Absorbing Layer is prepared in the same manner except for, in Formulation Example 1-1, further adding "Transparent Electrically Conductive ITO Ink X500" {fine particulate ITO having an average dispersion diameter of 100 to 140 nm, produced by Sumitomo Metal Mining Co., Ltd.} such that the ratio of titanium oxide (TI-A)/gelatin/ITO becomes 2/1/2.

Formulation Example 1-4

Preparation of Coating Solution (UV-D) for Ultraviolet Absorbing Layer

The followings are mixed to prepare Coating Solution (UV-D) for Ultraviolet Absorbing Layer.

| {Composition of Coating Solution (UV-D) for Ultraviolet Absorbing Layer} | |
|---|---|
| Styrene butadiene latex (solid content: 50%) | 258 parts |
| 2,4-Dichloro-6-hydroxy-s-triazine sodium salt (solid content: 8%) | 49 parts |
| Ultraviolet-Absorbing Polymer Particle (J) prepared in Synthesis Example 2 | 600 parts |
| Distilled water | 93 parts |

Formulation Example 1-5

Preparation of Coating Solution (UV-E) for Ultraviolet Absorbing Layer

Coating Solution (UV-E) for Ultraviolet Absorbing Layer is prepared in the same manner as in Formulation Example 1-4 except for using a UV absorbent-containing microemulsion particle, "SE-2538E", produced by Taisei Fine Chemical Co., Ltd. in place of Ultraviolet-Absorbing Polymer Particle (J) and distilled water in Formulation Example 1-4.

Formulation Example 1-6

Preparation of Coating Solution (UV-F) for Ultraviolet Absorbing Layer

Coating Solution (UV-F) for Ultraviolet Absorbing Layer is prepared in the same manner as in Formulation Example 1-4 except for not using Ultraviolet-Absorbing Polymer Particle (J) in Formulation Example 1-4.

Formulation Example 1-7

Preparation of Coating Solution (UV-G) for Ultraviolet Absorbing Layer

A benzotriazole-based ultraviolet absorbent (polymer UV agent) having a number average molecular weight of 250,000, which is obtained by copolymerizing 50% of methyl methacrylate and 50% of 2-[2'-hydroxy-5'-(methacryloyloxy)ethylphenyl]-2H-benzotiazole {"RUVA-93", trade name, produced by Otsuka Chemical Co., Ltd.} as an ultraviolet absorbing monomer, is dissolved in ethyl acetate to prepare Coating Solution (UV-G) for Ultraviolet Absorbing Layer containing 30% of a high-molecular weight ultraviolet absorbent.

Formulation Example 1-8

Preparation of Coating Solution (UV-H) for Ultraviolet Absorbing Layer

100 Parts of an ultraviolet-curable urethane acrylate oligomer {"Shiko UV7640B", produced by The Nippon Synthetic Chemical Industry Co., Ltd., number of acryloyl groups: 6 or 7 on average per molecule, molecular weight: 1,500}, 4 parts of 2-hydroxy-2-methyl-I-phenylpropane-1-one {"Darocure 1173", produced by Ciba Specialty Chemicals Corp.}, 2 parts of 2,4,6-trimethylbenzoyldiphenylphosphine oxide {"Lucirin TPO", produced by BASF), 20 parts of 2-(2H-benzotriazol-2yl)-4,6-di-tert-pentylphenol {("TINUVIN 328", produced by Ciba Specialty Chemicals Corp.} and 100 pans of methyl isobutyl ketone are mixed to prepare Coating Solution (UV-H) for Ultraviolet Absorbing Layer containing an ultraviolet-curable ultraviolet absorbent.

[Coating of Ultraviolet Absorbing Layer]

Reference Example 1

Production of Sample A

One surface of a cycloolefin-based film {"ZEONOR FILM ZF14-100", produced by ZEON Corp., thickness: 100 μm, moisture permeability: 30 $g/m^2 \cdot d$, glass transition temperature: 136° C.} is corona discharge-treated immediately before coating, and Coating Solution (UV-A) for Ultraviolet Absorbing Layer is coated thereon to have a light absorbance of 1 at 350 nm (Sample A).

As for the measuring method of moisture permeability, the methods described in Measurement of Vapor Permeation (mass method, thermometer method, vapor pressure method, adsorption method) of "Kobunshi no Bussei II (Physical Properties II of Polymers)" of *Kobunshi Jikken Koza* 4 (*Lecture or Polymer Experimentation* 4), pp. 285-294, Kyoritsu Shuppan Co., Ltd., may be applied. Film samples (70 mmφ) according to the present invention each is moisture-conditioned at 60° C. and 95% RH for 24 hours, and the water volume ($g/m^2$) per unit area is calculated in terms of (moisture permeability=mass after moisture conditioning–mass before moisture conditioning) by using a moisture-permeable cup according to JIS Z-0208. Correction of the moisture permeability value by using a blank cup containing no moisture absorbent is not performed.

Reference Example 2

Production of Sample B

Sample B is produced in the same manner as in Reference Example 1 except for using Coating Solution (UV-B) for Ultraviolet Absorbing Layer in place of using Coating Solution (UV-A) for Ultraviolet Absorbing Layer in Reference Example 1.

Reference Example 3

Production of Sample C

Sample C is produced in the same manner as in Reference Example 1 except for using Coating Solution (UV-C) for Ultraviolet Absorbing Layer in place of using Coating Solution (UV-A) for Ultraviolet Absorbing Layer in Reference Example 1.

In all of these samples A to C, the beam transmittance in the wavelength region of 200 to 340 nm is 5% or less.

Reference Example 4

Production of Sample D

One surface (the surface working out to an interface on adhesion of a light-diffusing layer) of a cycloolefin-based film "ZEONOR FILM ZF14-100" is glow discharge-treated immediately before coating, and Coating Solution (UV-D) for Ultraviolet Absorbing Layer is coated thereon and dried at 130° C. for 2 minutes to form an ultraviolet absorbing layer of 0.11 μm in thickness, whereby Sample D is produced.

Reference Examples 5 and 6

Production of Samples E and F

Samples E and F are produced in the same manner as in Reference Example 4 except for using Coating Solution (UV-E) or (UV-F) for Ultraviolet Absorbing Layer in place of using Coating Solution (UV-D) for Ultraviolet Absorbing Layer in Reference Example 4.

The beam transmittance in the wavelength region of 200 to 340 nm is 5% or less in Samples D and E and exceeds 5% in Sample F.

Reference Example 7

Production of Sample G

One surface (the surface working out to an interface on adhesion of a light-diffusing layer) of "ZEONOR FILM ZF14-100" is corona discharge-treated immediately before coating, and Coating Solution (UV-G) for Ultraviolet Absorbing Layer prepared in Formulation Example 1-7 is coated thereon using a #5 Mayer bar. This film in the state of being tensioned is dried in an oven at 80° C. for 10 minutes to produce Sample G of 0.4 μm in thickness. The beam transmittance in the wavelength region of 200 to 340 nm is 5% or less.

Reference Example 8

Production of Sample H

One surface (the surface working out to an interface on adhesion of a light-diffusing layer) of "ZEONOR FILM ZF14-100" is corona discharge-treated immediately before coating, and Coating Solution (UV-H) for Ultraviolet Absorbing Layer prepared in Formulation Example 1-8 is coated thereon using a #5 Mayer bar. This film in the state of being tensioned is dried in an oven at 80° C. for 10 minutes to produce Sample H of 1.0 μm in thickness. The beam transmittance in the wavelength region of 200 to 340 nm is 5% or less.

The construction and beam transmittance in the wavelength region of 200 to 340 nm of each of Samples A to H obtained in Reference Examples are shown in Table 1 together with the composition of the coating solution for ultraviolet absorbing layer.

Abbreviations in Table 1 are as follows.
"ZF14-100":
A cycloolefin-based film, "ZEONOR FILM ZF14-100", produced by ZEON Corp., thickness: 100 μm, moisture content: 0.01% or less, glass transition temperature: 136° C.
"TiO$_2$ (TI-A)":
Spindle-shaped fine particulate titanium oxide "TI-A", produced by Ishihara Sangyo Kaisha Ltd., average primary particle diameter of short axis diameter: 8 nm (short axis diameter at both ends of particle: 5 nm) and long axis diameter: 32 nm, aspect ratio: 4, rutile crystallinity: 44%.
"TiO$_2$ (TI-B)":
Spherical fine particulate titanium oxide "TI-B", produced by Ishihara Sangyo Kaisha, Ltd., average primary particle diameter: 12 nm, rutile crystallinity: 44%, surface-treated with aluminum oxide in 10% (based on titanium oxide).
"ITO":
"Transparent Electrically Conductive ITO Ink X500", produced by Sumitomo Metal Mining Co., Ltd., fine particulate ITO having an average dispersion diameter of 100 to 140 nm.
Polymer Particle (J):
Ultraviolet-Absorbing Polymer Particle (J) synthesized in Synthesis Example 2.
Polymer UV Agent:
A benzotriazole-based ultraviolet-absorbing polymer having a number average molecular weight of 250,000, which is obtained by copolymerizing 50% of methyl methacrylate and 50% of an ultraviolet absorbing monomer, "RUVA-93".
"SE-2538E":
A UV absorbent-containing microemulsion produced by Taisei Fine Chemical Co., Ltd.
"TINUVIN 328":
2-(2H-Benzotriazol-2-yl)-4,6-di-tert-pentylphenol produced by Ciba Specialty Chemicals Corp.
"SB Latex":
A styrene butadiene latex, "Nipol LX407H", produced by ZEON Corp., solid content: 50%.
"Shiko UV7640B":
An ultraviolet-curable urethane acrylate oligomer produced by The Nippon Synthetic Chemical Industry Co., Ltd., number of acryloyl groups: 6 or 7 on average per molecule, molecular weight: 1,500.

TABLE 1

| | Sample | Filmy Support | | Coating Solution for Ultraviolet Absorbing Layer | | | Beam Transmittance (%) in Wavelength Region of 200 to 340 nm |
|---|---|---|---|---|---|---|---|
| | No. | Kind | Surface Treatment | No. | Ultraviolet Absorbent | Binder | |
| Reference Example 1 | A | ZF14-100 | corona discharge treatment | UV-A | TiO$_2$ (T1-A) | gelatin | <5 |
| Reference Example 2 | B | " | corona discharge treatment | UV-B | TiO$_2$ (TI-B) | " | <5 |
| Reference Example 3 | C | " | corona discharge treatment | UV-C | TiO$_2$ (TI-A)/ITO | " | <5 |
| Reference Example 4 | D | " | glow discharge treatment | UV-D | Polymer Particle (J) | SB Latex | <5 |
| Reference Example 5 | E | " | " | UV-E | SE-2538E | " | <5 |
| Reference Example 6 | F | " | " | UV-F | — | " | >5 |
| Reference Example 7 | G | " | corona discharge treatment | UV-G | polymer UV agent | — | <5 |
| Reference Example 8 | H | " | corona discharge treatment | UV-H | TINUVIN 328 | Shiko UV7640B | <5 |

[Preparation of Coating Solution for Hardcoat Layer]

Formulation Example 2-1

Preparation of Coating Solution (HC1) for Antiglare Hardcoat Layer

| {Composition of Coating Solution (HC1) for Antiglare Hardcoat Layer} | |
| --- | --- |
| "PET-30" | 50.0 g |
| "Irgacure 184" | 2.0 g |
| "SX-350" (30%) | 1.7 g |
| Crosslinked acryl-styrene particle (30%) | 13.3 g |
| "FP-13" | 0.05 g |
| "KBM-5103" | 10.0 g |
| Toluene | 38.5 g |

The coating solution obtained by mixing the components above is filtered through a polypropylene-made filter having a pore size of 30 μm to prepare Coating Solution (HC1) for Antiglare Hardcoat Layer.

Formulation Example 2-2

Preparation of Coating Solution (HC2) for Light-Diffusing Hardcoat Layer

| {Composition of Coating Solution (HC2) for Light-Diffusing Hardcoat Layer} | |
| --- | --- |
| "Desolite Z7404" | 100 g |
| "DPHA" | 31 g |
| "KBM-5103" | 10 g |
| "KE-P150" | 8.9 g |
| "MXS-300" | 3.4 g |
| MEK | 19 g |
| MIBK (methyl isobutyl ketone) | 13 g |

The coating solution obtained by mixing the components above is filtered through a polypropylene-made filter having a pore size of 30 μm to prepare Coating Solution (HC2) for Light-Diffusing Hardcoat Layer.

[Preparation of Coating Solution for Low Refractive Index Layer]

Synthesis Example 3

Preparation of Sol Solution a

In a reaction vessel equipped with a stirrer and a reflux condenser, 120 parts of methyl ethyl ketone, 100 parts of acryloyloxypropyltrimethoxysilane {"KBM-5103", produced by Shin-Etsu Chemical Co., Ltd.} and 3 parts of diisopropoxyaluminum ethyl acetate are added and mixed and after adding 30 parts of ion-exchanged water, the reaction is allowed to proceed at 60° C. for 4 hours. The reaction solution is then cooled to room temperature to obtain Sol Solution a. The mass average molecular weight is 1,600 and out of the oligomer or higher components, the proportion of the components having a molecular weight of 1,000 to 20,000 is 100%. Also, from the gas chromatography analysis, it is revealed that the raw material acryloyloxypropyl-trimethoxysilane does not remain at all.

Formulation Example 3-1

Preparation of Coating Solution (LL1) for Low Refractive Index Layer

| {Composition of Coating Solution (LL1) for Low Refractive Index Layer} | |
| --- | --- |
| "DPHA" | 3.3 g |
| Hollow silica (18.2%) | 40.0 g |
| "RMS-033" | 0.7 g |
| "Irgacure 907" | 0.2 g |
| Sol Solution a | 6.2 g |
| MEK | 299.6 g |

The coating solution is stirred and then filtered through a polypropylene-made filter having a pore size of 1 μm to prepare Coating Solution (LL1) for Low Refractive Index Layer.

Formulation Example 3-2

Preparation of Coating Solution (LL2) for Low Refractive Index Layer

| {Composition of Coating Solution (LL2) for Low Refractive Index Layer} | |
| --- | --- |
| "Opstar JTA113" (6%) | 13.0 g |
| "MEK-ST-L" (30%) | 1.3 g |
| Sol Solution a | 0.6 g |
| MEK | 5.0 g |
| Cyclohexanone | 0.6 g |

The coating solution is stirred and then filtered through a polypropylene-made filter having a pore size of 1 μm to prepare Coating Solution (LL2) for Low Refractive Index Layer.

The compounds used in Formulation Examples 2-1, 2-2, 3-1 and 3-2 are shown below.

"PET-30":

A mixture of pentaerythritol triacrylate and pentaerythritol tetraacrylate, produced by Nippon Kayaku Co., Ltd.

"Irgacure 184":

A polymerization initiator produced by Ciba Specialty Chemicals Corp. "SX350":

A crosslinked polystyrene particle having an average particle diameter of 3.5 μm, refractive index: 1.61, produced by The Soken Chemical & Engineering Co., Ltd., a 30% toluene liquid dispersion, used after dispersion in a polytren dispersing machine at 10,000 rpm for 20 minutes.

Crosslinked Acryl-Styrene Particle:

Average particle diameter: 3.5 μm, refractive index: 1.55, produced by The Soken Chemical & Engineering Co., Ltd., a 30% toluene liquid dispersion, used after dispersion in a polytron dispersing machine at 10,000 rpm for 20 minutes.

"FP-13": A Fluorine-Containing Polymer.

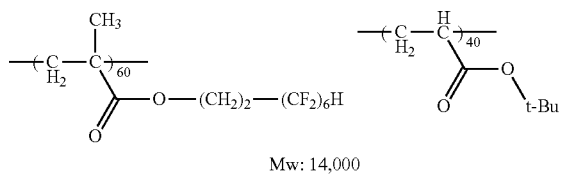

Mw: 14,000

"KBM-5103":

A silane coupling agent produced by Shin-Etsu Chemical Co., Ltd.

"Desolite Z7404":

A $ZrO_2$ fine particle-containing hardcoat agent, refractive index: 1.62, solid content concentration: 60%, zirconium oxide fine particle content: 70% (based on solid content), average particle diameter of zirconium oxide fine particle: about 20 nm, solvent composition: MIBK/MEK=9/1, produced by JSR Corp.

"DPHA":

A mixture of dipentaerythritol pentaacrylate and dipentaerythritol hexaacrylate, refractive index: 1.52, produced by Nippon Kayaku Co., Ltd.

"KEP-150":

A silica particle having an average particle diameter of 1.5 μm, refractive index: 1.46, produced by Nippon Shokubai Co., Ltd., a 30% MEK liquid dispersion, used after dispersion in a polytron dispersing machine at 10,000 rpm for 20 minutes.

"MXS-300":

A polymethyl methacrylate (PMMA) particle having an average particle diameter of 3 μm, refractive index: 1.49, produced by The Soken Chemical & Engineering Co., Ltd., a 30% MIBK liquid dispersion, used after dispersion in a polytron dispersing machine at 10,000 rpm for 20 minutes.

Hollow Silica:

A hollow silica fine particle liquid dispersion prepared in Synthesis Example 4 below.

"RMS-033":

A reactive silicone (produced by Gelest)

"Irgacure 907":

A photopolymerization initiator {produced by Ciba Specialty Chemicals Corp.}

Sol Solution a:

The solution prepared in Synthesis Example 3.

"Opstar JTA113":

A thermally crosslinking fluorine-containing polymer, refractive index: 1.44, solid content concentration: 6%, produced by JSR Corp.

"MEK-ST-L:

A colloidal silica liquid dispersion, a product differing in the particle size from MEK-ST, average particle diameter: 45 nm, solid content concentration: 30%, produced by Nissan Chemicals Industries, Ltd.

Synthesis Example 4

Preparation of Hollow Silica Fine Particle Liquid Dispersion

30 Parts of acryloyloxypropyltrimethoxysilane "KBM-5103" {produced by Shin-Etsu Chemical Co., Ltd.} and 1.5 parts of diisopropoxyaluminum ethyl acetate are added and mixed with 500 parts of a hollow silica fine particle sol, "CS60-IPA" {isopropyl alcohol silica sol, produced by Catalysts & Chemicals Ind. Co., Ltd., average particle diameter: 60 nm, shell thickness: 10 nm, silica concentration: 20%, refractive index of silica particle: 1.31}, and 9 parts of ion-exchanged water is added thereto. After allowing the reaction to proceed at 60° C. for 8 hours, the reaction solution is cooled to room temperature and 1.8 parts of acetylacetone is added thereto obtain a hollow silica liquid dispersion. The solid content concentration of the obtained hollow silica liquid dispersion is 18%, and the refractive index after drying the solvent is 1.31.

[Production of Optical Film]

Example 1

{Production of Optical Film (OF1)}

On the ultraviolet absorbing layer of Sample A produced in Reference Example 1, Coating Solution (HC1) for Antiglare Hardcoat layer is coated using a doctor blade and a microgravure roll having a diameter of 50 mm and leaving a gravure pattern with a line number of 135 lines/inch and a depth of 60 μm under the conditions of a transportation speed of 10 m/min and dried at 60° C. for 150 seconds, and the coated layer is further cured by irradiating thereon an ultraviolet ray at an illuminance of 400 mW/cm$^2$ and an irradiation dose of 250 mJ/cm$^2$ with use of "Air-Cooled Metal Halide Lamp" {manufactured by Eye Graphics Co., Ltd.} of 160 W/cm under nitrogen purging to form an antiglare hardcoat layer (thickness: 6 μm). The resulting film is taken up. In this way, Optical Film (OF1) is produced.

{Production of Optical Film (OF2)}

Optical Film (OF1) produced is again unrolled, and Coating Solution (LL2) for Low Refractive Index Layer is coated on the antiglare hardcoat layer by using a doctor blade and a microgravure roll having a diameter of 50 mm and having a gravure pattern with a line number of 200 lines/inch and a depth of 30 μm under the conditions of a transportation speed of 20 m/min. After drying at 120° C. for 75 seconds, the coated layer is further dried for 10 minutes and then irradiated with an ultraviolet ray at an illuminance of 400 mW/cm$^2$ and an irradiation dose of 240 mJ/cm$^2$ with use of "Air-Cooled Metal Halide Lamp" {manufactured by Eye Graphics Co., Ltd.} of 240 W/cm under nitrogen purging to form a low refractive index layer of 100 nm in thickness. The resulting film is taken up. In this way, Optical Film (OF2) {antireflection film} is produced.

{Production of Optical Films (OF3) to (OF11), (OFr1) and (OFr2)}

Optical Films (OF3) to (OF11), (OFr1) and (OFr2) are produced in the same manner as Optical Films (OF1) and (OF2) except that, as shown in Table 2, any one of Samples A to G is used as the film for forming an ultraviolet-absorbing layer, and the hardcoat layer and low refractive index layer are formed using Coating Solution (HC1) for Antiglare Hardcoat Layer or Coating Solution (HC2) for Light-Diffusing Hardcoat Layer as the coating solution for hardcoat layer and using Coating Solution (LL1) or (LL2) for Low Refractive Index Layer as the coating solution for low refractive index layer, or a low refractive index layer is not formed.

{Production of Optical Film (OFr3)}

Optical Film (OFr3) is produced using, as shown in Table 2, Sample H as the film for forming an ultraviolet-absorbing layer and using Coating Solution (HC1) for Antiglare Hardcoat Layer.

{Production of Optical Film (OFr4) to (OFr7)}

On a triacetyl cellulose film, "TAC-TD80U" {produced by FUJIFILM Corporation, thickness: 80 μm, moisture permeability: 1,400 g/m²·d} having a thickness of 80 μm and a width of 1,340 mm, as shown in Table 2, Coating Solution (HC1) for Antiglare Hardcoat Layer or Coating Solution (HC2) for Light-Diffusing Hardcoat Layer is coated directly using a doctor blade and a microgravure roll having a diameter of 50 mm and having a gravure pattern with a line number of 135 lines/inch and a depth of 60 μm under the conditions of a transportation speed of 10 m/min and dried at 60° C. for 150 seconds, and the coated layer is further cured by irradiating thereon an ultraviolet ray at an illuminance of 400 mW/cm² and an irradiation dose of 250 ml/cm² with use of an air-cooled metal halide lamp (manufactured by Eye Graphics Co., Ltd.) of 160 W/cm under nitrogen purging to form an antiglare hardcoat layer (thickness: 6 μm) or light-diffusing hardcoat layer (thickness: 3.4 μm). The resulting film is taken up.

Subsequently, as shown in Table 2, a low refractive index layer is formed using Coating Solution (LL1) or (LL2) for Low Refractive Index Layer or a low refractive index layer is not formed, whereby Optical Films (OFr4) to (OFr7) for comparison are produced.

[Evaluation of Optical Film]

With respect to these obtained optical film samples, the transmittance is measured, as a result, in all of Samples 1 to 11 of the present invention, the transmittance at 380 nm is from 0 to 50% and the transmittance at 600 nm is from 80 to 100%. Furthermore, the following items are evaluated. The results are shown in Table 2.

(1) Average Reflectance

The spectral reflectance at an incident angle of 5° is measured in the wavelength region of 380 to 780 nm by using a spectrophotometer (manufactured by JASCO Corp.). The average reflectance in 450 to 650 nm is used for the result.

(2) Evaluation of White Powderiness at Coating

After once taking up the sample where an ultraviolet-absorbing layer is coated, the sample is unrolled for coating a hardcoat layer and the amount of white powder adhering at this time to the roller in contact with the ultraviolet-absorbing layer surface is used for the evaluation. The state where adhered white powder is observed with an eye on delivering 100 m of the sample is rated B.

A: No white powder adhering to roller and no surface state defect.

B: Visible white powder adhering to roller, no repelling in the hardcoat layer.

C: Visible white powder adhering to roller, occurrence of repelling in the hardcoat layer.

(3) Haze

The entire haze (H) of the obtained optical film is measured according to JIS K-7136.

(4) Eraser Scratch Resistance

The optical film is fixed on a glass surface with a pressure-sensitive adhesive, and an eraser "MONO" (trade name) {produced by Tombo Pencil Co., Ltd.} cut out into a diameter of 8 mm and a thickness of 4 mm and used as the rubbing tester head is pressed vertically on the optical film surface from above under a load of 500 g/cm² and moved back and force 200 times with a stroke length of 3.5 cm at a rubbing rate of 1.8 cm/sec under the conditions of 25° C. and 60 RH %. After removing the attached eraser, the rubbed part of the sample is confirmed with an eye. This test is repeated 3 times, and the average degree of surface abrasion is evaluated on a scale of the following 4 ratings.

A: Abrasion is scarcely observed.

B: Abrasion is slightly observed.

C; Abrasion is clearly observed.

D: Abrasion is observed over the entire rubbed portion.

(5) Evaluation of Adhesion

The optical film surface on the side having the hardcoat layer is incised with a cutter knife to form 11 vertical lines and 11 horizontal lines in a grid pattern and thereby define 100 squares in total, and an adhesion test is repeated three times on the same site by press-bonding a polyester pressure-sensitive adhesive tape "No. 31B" produced by Nitto Denko Corp. The presence or absence of separation is observed with an eye and evaluated on a scale of the following 4 ratings.

A: Separation is not observed at all in 100 squares.

B: The number of squares separated out of 100 squares is 2 or less.

C: The number of squares separated out of 100 squares is from 3 to 10.

D: The number of squares separated out of 100 squares is more than 10.

(6) Evaluation of Light Fastness

Three sheets, that is, a protective film, a polarizer and an optical film are laminated in this order to produce a polarizing plate. At this time, a norbornene-based polymer film "ZEONOR FILM ZF14-100" {produced by ZEON Corp., thickness: 100 μm} is used as the protective film. Also, the polarizing plate is laminated by arranging the lower reflective index side (or hardcoat layer side) of the optical film to become the surface. The produced polarizing plate is set in "EYE Super UV Tester" {a metal halide lamp, manufactured by Iwasaki Electric Co., Ltd.} and after irradiating an ultraviolet ray at an intensity of 70 mW/cm² for 200 hours from the lower refractive index layer (or hardcoat layer) side of the polarizing plate, discoloration of the polarizing plate is observed with an eye.

TABLE 2

| | | | Optical Film | | | | Evaluation | | | | | |
|---|---|---|---|---|---|---|---|---|---|---|---|---|
| | | | Film for Forming Ultraviolet-Absorbing Layer | | Coating | Coating Solution for Low Refractive Index Layer | | | | | | |
| Remarks | Sample No. | Sample No. | Filmy Support | Sample No. | Coating Solution for Hardcoat Layer | | Average Reflectance (%) | White Powderiness | Entire Haze (%) | Eraser Scratch Resistance | Adhesion | Light Fastness |
| Invention | 1 | OF1 | ZF14-100 | A | HC1 | — | 3.9 | A | 41.0 | A | B | not discolored |
| Invention | 2 | OF2 | " | " | " | LL2 | 2.6 | A | 41.0 | A | A | not discolored |
| Invention | 3 | OF3 | " | " | HC2 | LL1 | 1.6 | A | 68.1 | A | B | not discolored |
| Invention | 4 | OF4 | " | " | " | LL2 | 2.3 | A | 68.5 | A | A | not discolored |
| Invention | 5 | OF5 | " | B | HC1 | LL1 | 1.9 | A | 41.0 | A | B | slightly yellowed |

TABLE 2-continued

| | | Optical Film | | | | Evaluation | | | | | |
|---|---|---|---|---|---|---|---|---|---|---|---|
| | | Film for Forming Ultraviolet-Absorbing Layer | | Coating Solution for Hardcoat | Coating Layer | Solution for Low | Average Reflect- | White Pow- | Entire Haze | Eraser Scratch | Adhe- | |
| Remarks | Sample No. | No. | Filmy Support | Sample No. | Hardcoat Layer | Refractive Index Layer | ance (%) | deriness | (%) | Resistance | sion | Light Fastness |
| Invention | 6 | OF6 | " | " | HC2 | — | 4.2 | A | 68.2 | A | B | slightly yellowed |
| Invention | 7 | OF7 | " | " | " | LL2 | 2.3 | A | 68.3 | A | A | slightly yellowed |
| Invention | 8 | OF8 | " | C | HC1 | LL2 | 2.6 | A | 35.0 | A | A | not discolored |
| Invention | 9 | OF9 | " | " | HC2 | LL2 | 2.3 | A | 89.3 | A | A | not discolored |
| Invention | 10 | OF10 | " | D | HC1 | LL1 | 1.9 | A | 35.0 | A | B | not discolored |
| Invention | 11 | OF11 | " | E | HC2 | LL1 | 1.6 | A | 68.1 | A | A | not discolored |
| Comparative Example | 12 | OFr1 | " | F | HC1 | — | 3.9 | A | 41.0 | A | D | yellowed |
| Comparative Example | 13 | OFr2 | " | G | HC2 | LL1 | 1.6 | B | 68.1 | B | C | slightly yellowed |
| Comparative Example | 14 | OFr3 | " | H | HC1 | — | 3.9 | C | 41.0 | A | B | slightly yellowed |
| Comparative Example | 15 | OFr4 | TAC | — | " | — | 3.9 | A | 41.0 | A | B | yellowed |
| Comparative Example | 16 | OFr5 | " | — | " | LL2 | 2.6 | A | 41.0 | A | B | not discolored |
| Comparative Example | 17 | OFr6 | " | — | HC2 | LL1 | 1.6 | A | 68.3 | A | B | not discolored |
| Comparative Example | 18 | OFr7 | " | — | " | LL2 | 2.3 | A | 68.1 | A | A | not discolored |

The refractive index of the low refractive index layer is from 1.38 to 1.45, and the refractive index of the hardcoat layer is from 1.50 to 1.62.

The results shown in Table 2 reveal the followings.

The optical film of the present invention has good light fastness, does not generate white powder at the coating of a light-diffusing layer, exhibits excellent adhesion, satisfies the optical properties in a good balance, and is enhanced in the total performance as an antireflection film.

Example 2

A 80 μm-thick triacetyl cellulose (TAC) film {"TD80U" produced by FUJIFILM Corporation} is dipped in an aqueous 1.5 mol/L NaOH solution at 55° C. for 2 minutes, then neutralized and washed with water. This alkali-treated TAC film and each of Optical Films (OF1) to (OF11) and (OFr1) to (OFr7) produced in Example 1 are laminated for protection on both surfaces of a polarizer produced by adsorbing iodine to a polyvinyl alcohol film and stretching the film, whereby polarizing plates are produced. A polarizing plate provided in a liquid crystal display device "MRT-191S" {manufactured by Mitsubishi Electric Corp.} using a TN-mode liquid crystal cell is stripped off, and each polarizing plate obtained above is instead laminated through a pressure-sensitive adhesive such that the cycloolefin-based film face or TAC film face comes to the outer side (air interface side) and at the same time, the transmission axis of the polarizing plate coincides with the polarizing plate originally laminated in the product. The obtained liquid crystal devices each is treated at 60° C. and 90% RH for 50 hours or at 70° C. and 10% RH for 50 hours, and then left standing in an environment of 25° C. and 60% RH for 2 hours. Thereafter, the liquid crystal display device is displayed in black, and light leakage from the front face is evaluated with an eye by a plurality of viewers. In the polarizing plate using the optical film (OF1 to OF11) of the present invention, light leakage is not observed, but in the polarizing plate using the optical film (OFr1 to OFr7) of Comparative Examples, light leakage is clearly observed.

Example 3

A polarizing plate provided in a VA-mode liquid crystal display device "LC-26GD3" {manufactured by Sharp Corp.} is stripped off together with a phase difference film, and the polarizing plates of the present invention obtained in Example 2 each is instead laminated such that the cycloolefin-based film face or TAC film face comes to the outer side (air interface side) and at the same time, the transmission axis of the polarizing plate coincides with the polarizing plate originally laminated in the product.

Furthermore, a polarizing plate provided in an IPS-mode liquid crystal display device "Th-26LX300" {manufactured by Matsushita Electric Industrial Co., Ltd.} is stripped off, and the polarizing plates of the present invention obtained in Example 2 each is instead laminated such that the cycloolefin-based film face or TAC film face comes to the outer side (air interface side) and at the same time, the transmission axis of the polarizing plate coincides with the polarizing plate originally laminated in the product.

These liquid crystal devices are also treated at 60° C. and 90% RH for 50 hours or at 70° C. and 10% RH for 50 hours, and then left standing in an environment of 25° C. and 60% RH for 2 hours. Thereafter, the liquid crystal display device is displayed in black, and light leakage from the front face is evaluated with an eye by a plurality of viewers. In the polarizing plate using the optical film (OF1 to OF11) of the present invention, light leakage is scarcely observed, but in the polarizing plate using the optical film (OFr1 to OFr7) of Comparative Examples, light leakage is clearly observed.

According to the present invention, an ultraviolet absorbing layer containing at least one ultraviolet absorbent selected from a metal oxide fine particle and a polymer particle and a hardcoat layer are stacked on a film comprising a polymer having an alicyclic structure to form an optical film, whereby an optical film ensuring that the deterioration by an ultraviolet ray is small, the antireflection capability is excellent and the dimensional change due to humidity is reduced, can be obtained. Also, white powder resulting from vaporization of an ultraviolet absorbent in the ultraviolet absorbing layer is not generated at the time of stacking the hardcoat layer, so that an optical film free from defects such as repelling at the production can be obtained. The polarizing plate and liquid crystal display device of the present invention using such an optical film can give a high-quality image with excellent visibility in various use environments. Furthermore, the film property is strong, so that separation of layers during production or handling (e.g., coating, transportation) can be avoided and excellent scratch resistance can also be afforded.

The entire disclosure of each and every foreign patent application from which the benefit of foreign priority has been claimed in the present application is incorporated herein by reference, as if fully set forth.

What is claimed is:

1. An optical film comprising:
    a filmy support that comprises a polymer having an alicyclic structure;
    an ultraviolet absorbing layer on the filmy support; and
    a hardcoat layer,
    wherein the ultraviolet absorbing layer has a beam transmittance of 5% or less in a wavelength region of 200 to 340 nm and comprises at least one ultraviolet absorbent which is a polymer particle,
    the polymer particle comprises a compound having an absorption capability in an ultraviolet region of 200 to 340 nm,
    the ultraviolet absorbent has a benzotriazole-based mother nucleus, a benzophenone-based mother nucleus, a phenyl salicylate-based mother nucleus, or a triazine-based mother nucleus, and
    wherein the alicyclic structure is in a repeating unit of the polymer, and a proportion of the repeating unit having the alicyclic structure in the polymer is 50 mass % or more.
2. The optical film of claim 1, wherein
    an ultraviolet absorbing monomer, which is one of raw materials of the polymer particle, is a vinyl compound, to a main chain of which at least one of a 2-hydroxybenzophenone derivative and a 2-hydroxyphenylbenzotriazole derivative is bonded as a side chain.
3. The optical film of claim 1, wherein
    the ultraviolet absorbing layer comprises an electrically conductive metal oxide.
4. The optical film of claim 1, wherein
    the ultraviolet absorbing layer has a thickness of 50 to 2,000 nm.
5. The optical film of claim 1, which has an internal haze of 10 to 90%.
6. The optical film of claim 1, comprising:
    a low refractive index layer as an outermost layer of the optical film,
    wherein the low refractive index layer has a refractive index lower than a refractive index of a layer adjacent to the low refractive index layer.
7. The optical film of claim 1, which has a transmittance of 0 to 50% to light at a wavelength of 380 nm and a transmittance of 80 to 100% to light at a wavelength of 600 nm.
8. The optical film of claim 1, wherein
    the filmy support has a moisture permeability of 300 g/m$^2$·day or less at 60° C. and 95% relative humidity.
9. The optical film of claim 1, wherein
    the filmy support has a thickness of 5 to 200 μm.
10. The optical film of claim 1, wherein
    the filmy support has a glass transition temperature of 80° C. or more.
11. The optical film of claim 1, wherein
    at least one surface of the filmy support is corona discharge-treated or glow discharge-treated.
12. A polarizing plate comprising:
    a polarizer; and
    the optical film of claim 1.
13. The polarizing plate of claim 12, wherein
    the polarizer is sandwiched between two protective films, one of which is the optical film and the other of which is a film that mainly comprises a cellulose ester film.
14. The polarizing plate of claim 13, wherein
    the film mainly comprising a cellulose ester film has a viewing angle compensating function.
15. The polarizing plate of claim 13, wherein
    the film mainly comprising a cellulose ester film has an optically anisotropic layer provided by coating.
16. A liquid crystal display device comprising:
    a liquid crystal cell; and
    a pair of polarizing plates, between which the liquid crystal display is sandwiched,
    wherein
    at least one of the pair of polarizing plates is the polarizing plate of claim 12.
17. The liquid crystal display device of claim 16, further comprising:
    a brightness-enhancing film.
18. The optical film of claim 1, wherein
    the ultraviolet absorbing layer comprises at least one binder selected from the group consisting of an urethane-base polymer, a reactive functional group containing silicone compound, an olefin-based polymer, a vinyl ester-based latex, a (meth)acrylic acid-based latex, a styrene-based latex and a hydrophilic polymer.

* * * * *